(12) United States Patent
Downing et al.

(10) Patent No.: US 10,818,077 B2
(45) Date of Patent: Oct. 27, 2020

(54) METHOD, SYSTEM AND APPARATUS FOR CONTROLLING A VIRTUAL CAMERA

(71) Applicant: CANON KABUSHIKI KAISHA, Tokyo (JP)

(72) Inventors: Andrew Peter Downing, West Pennant Hills (AU); Berty Jacques Alain Bhuruth, Bankstown (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/221,217

(22) Filed: Dec. 14, 2018

(65) Prior Publication Data

US 2020/0188787 A1 Jun. 18, 2020

(51) Int. Cl.
*G06T 15/20* (2011.01)
*A63F 13/5258* (2014.01)

(52) U.S. Cl.
CPC ........ *G06T 15/205* (2013.01); *A63F 13/5258* (2014.09); *G06T 15/20* (2013.01)

(58) Field of Classification Search
CPC ................... G06T 15/20; G06T 19/003; G06F 3/048–04897
See application file for complete search history.

(56) References Cited

U.S. PATENT DOCUMENTS

| | | | |
|---|---|---|---|
| 7,142,209 B2 | 11/2006 | Uyttendaele et al. | |
| 8,243,122 B2 | 8/2012 | Ishikawa et al. | |
| 8,823,707 B2 | 9/2014 | Barcay | |
| 9,616,339 B2 | 4/2017 | Edsall | |
| 2005/0024496 A1 | 2/2005 | Hiroto et al. | |
| 2008/0178232 A1* | 7/2008 | Velusamy | H04N 5/23203 725/88 |
| 2008/0192116 A1 | 8/2008 | Tamir et al. | |
| 2009/0128568 A1 | 5/2009 | Gloudemans et al. | |
| 2010/0020068 A1* | 1/2010 | House | G06T 15/20 345/419 |
| 2011/0254958 A1* | 10/2011 | Kotani | G06T 15/205 348/159 |
| 2012/0057852 A1 | 3/2012 | Devleeschouwer et al. | |

(Continued)

FOREIGN PATENT DOCUMENTS

WO 2018/100928 A1 6/2018

OTHER PUBLICATIONS

NPL Video Titled "Virtual Video Camera: Image-Based Viewpoint Navigation Through Space and Time", Published Sep. 5, 2011, available at: https://www.youtube.com/watch?v=ST6KKoHrmso; select screenshots included. (Year: 2011).*

(Continued)

*Primary Examiner* — Daniel F Hajnik
(74) *Attorney, Agent, or Firm* — Canon U.S.A., Inc. IP Division

(57) ABSTRACT

A method of controlling a virtual camera within a three-dimensional volume associated with a scene. A virtual camera position within the three-dimensional volume is determined. Coverage, by a plurality of physical cameras, of at least a portion of the scene as viewed from a plurality of viewpoints associated with the virtual camera position, is determined. The virtual camera is controlled to generate a view of the scene, based on the determined coverage, in response to receiving a user command changing at least one viewpoint attribute of the virtual camera.

17 Claims, 23 Drawing Sheets

(56) References Cited

U.S. PATENT DOCUMENTS

| | | | |
|---|---|---|---|
| 2012/0127169 A1 | 5/2012 | Barcay | |
| 2013/0135315 A1* | 5/2013 | Bares | G06T 13/20 |
| | | | 345/473 |
| 2013/0321575 A1 | 12/2013 | Kirk | |
| 2015/0195443 A1* | 7/2015 | Dal Mutto | H04N 5/2628 |
| | | | 348/211.11 |
| 2016/0320951 A1* | 11/2016 | Ernst | G06F 3/04842 |
| 2017/0094259 A1* | 3/2017 | Kouperman | H04N 13/111 |
| 2017/0118458 A1* | 4/2017 | Gronholm | H04N 19/124 |
| 2017/0173468 A1 | 6/2017 | Edsall | |
| 2018/0004881 A1 | 2/2018 | Matsushita | |
| 2018/0182114 A1 | 6/2018 | Hanamoto | |
| 2018/0197324 A1 | 7/2018 | Hanamoto | |
| 2018/0343442 A1* | 11/2018 | Yoshikawa | G08B 13/19608 |
| 2019/0051051 A1* | 2/2019 | Kaufman | G01C 21/32 |
| 2019/0174109 A1* | 6/2019 | Yoshikawa | H04N 21/21805 |
| 2019/0311526 A1* | 10/2019 | Sugio | G06T 9/00 |

OTHER PUBLICATIONS

NPL Video Titled "Free Viewpoint Interpolation for soccer games", Published Mar 4, 2014, available at: https://www.youtube.com/watch?v=6MzeXeavE1s; select screenshots included. (Year: 2014).*

* cited by examiner

METHOD, SYSTEM AND APPARATUS FOR CONTROLLING A VIRTUAL CAMERA

TECHNICAL FIELD

The present invention relates to free viewpoint navigation of a virtual camera and, in particular, to the management of video quality during the free viewpoint navigation of the virtual camera in and around a volumetric space captured by arrays of physical video cameras. The present invention also relates to a method and apparatus for controlling a virtual camera, and to a computer program product including a computer readable medium having recorded thereon a computer program for controlling a virtual camera.

BACKGROUND

One example of a volumetric space that might be captured by arrays of physical video cameras is a sports stadium. Other examples include music venues, acting theatres and film sets.

There are many methods known in the industry for processing physical video camera data into a continuous frame-by-frame three-dimensional (3d) or "volumetric" representation of the activity in the sports stadium, for example. Once a volumetric representation is available, selected perspectives within the sports stadium may be rendered, limited only by geometry and resolution of the available data.

Methods of processing a plurality of physical video camera inputs into a volumetric representation of a region are limited by geometry of the physical video cameras relative to the region to be represented. Baseline quality limits on virtual camera output derive from the geometric arrangement of the physical cameras around the region relative to virtual camera point of view that is set according to the virtual camera positioning and framing intentions of a virtual video camera operator.

Many volumetric capture scenarios require three-hundred and sixty (360) degree coverage around an arena. Opportunities for positioning physical video cameras are typically limited to regions surrounding a sports field in the arena, since placing the physical video cameras in-field would interfere with on-field action. In a sports stadium, positioning of physical video cameras may be limited by availability of camera mounting points around the stadium. In other scenarios, positioning of physical video cameras may be limited in other ways. For example, a music or live acting theatre with a stage at one end may have less than one-hundred and eighty (180) degrees of coverage possible from a front of the stage by arranging cameras around the theatre, but have no coverage possible from behind the stage.

Other limitations on availability of physical video cameras to contribute to volumetric capture of a region may be intermittent or unintentional. For example, failure of physical video cameras or their supporting data networks may leave coverage gaps that were unexpected at the time of camera deployment and system design. Simple maintenance or environmental issues such as dirt, rain, snow or even sunlight shining directly into a lens may make some individual cameras unusable from time to time.

There is a need to resolve the difficulty for a human camera operator using controls to guide the point of view of a virtual camera through and around a volumetric space captured by arrays of physical cameras. Resolving such difficulty allows the camera operator to navigate the virtual camera in a manner that is commensurate with both capturing an aesthetically pleasing view of the scene while also trying to navigate successfully through the complex geometry of visual error propagated through a system.

Conventional virtual camera navigation in video games or other pure-virtual three-dimensional (3D) environments with virtual camera navigation operates in a context that provides full knowledge of all objects and animations operational in the virtual scene. As such, virtual camera navigation reduces to a problem of object and occlusion avoidance. There may be outer bounds to navigable regions. However, the outer bounds are usually managed by controlling topology of the virtual environment (e.g. walls or mountains in the way) to block the virtual camera from ever moving into positions that are not able to be rendered.

Virtual camera navigation in some conventional applications have built-in limitations to virtual camera positioning. For example, for one such application, cars use a camera to capture a 360 degree snapshot view of a street and surrounding areas at a point in time. If conditions were unfavourable or any faults occurred with equipment, the cars may just drive down the street again and re-capture the scene. The user driven virtual camera replay part of the application is not concerned with movement, actual capture time or equipment failure and the user is not allowed to place their virtual camera anywhere other than the road. Therefore, virtual camera rendering is constrained in this conventional application to perspectives and distances that are known to be supported by the physical camera captured views taken by the camera.

SUMMARY

It is an object of the present invention to substantially overcome, or at least ameliorate, one or more disadvantages of existing arrangements.

Disclosed are methods for illustrating the complex quality geometry of a system for volumetric video capture of a live environment. The disclosed methods may be used to assist virtual camera operators to navigate a virtual camera through the volumetric space in such as manner as to achieve quality video output when the system renders the virtual camera view.

According to one aspect of the present disclosure, there is provided a method of controlling a virtual camera within a three-dimensional volume associated with a scene, the method comprising:
  determining a virtual camera position within the three-dimensional volume;
  determining coverage, by a plurality of physical cameras, of at least a portion of the scene as viewed from a plurality of viewpoints associated with the virtual camera position; and
  controlling the virtual camera to generate a view of the scene, based on the determined coverage, in response to receiving a user command changing at least one viewpoint attribute of the virtual camera.

According to another aspect of the present disclosure, there is provided a system for controlling a virtual camera within a three-dimensional volume associated with a scene, the system comprising:
  a memory for storing data and a computer program;
  a processor coupled to the memory for executing the program, the program comprising instructions for:
    determining a virtual camera position within the three-dimensional volume;

determining coverage, by a plurality of physical cameras, of at least a portion of the scene as viewed from a plurality of viewpoints associated with the virtual camera position; and controlling the virtual camera to generate a view of the scene, based on the determined coverage, in response to receiving a user command changing at least one viewpoint attribute of the virtual camera.

According to still another aspect of the present disclosure, there is provided an apparatus for controlling a virtual camera within a three-dimensional volume associated with a scene, the apparatus comprising:

means for determining a virtual camera position within the three-dimensional volume;

means for determining coverage, by a plurality of physical cameras, of at least a portion of the scene as viewed from a plurality of viewpoints associated with the virtual camera position; and means for controlling the virtual camera to generate a view of the scene, based on the determined coverage, in response to receiving a user command changing at least one viewpoint attribute of the virtual camera.

According to still another aspect of the present disclosure, there is provided a non-transitory computer readable medium having a computer program stored on the medium for controlling a virtual camera within a three-dimensional volume associated with a scene, the program comprising:

code for determining a virtual camera position within the three-dimensional volume;

code for determining coverage, by a plurality of physical cameras, of at least a portion of the scene as viewed from a plurality of viewpoints associated with the virtual camera position; and code for controlling the virtual camera to generate a view of the scene, based on the determined coverage, in response to receiving a user command changing at least one viewpoint attribute of the virtual camera.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
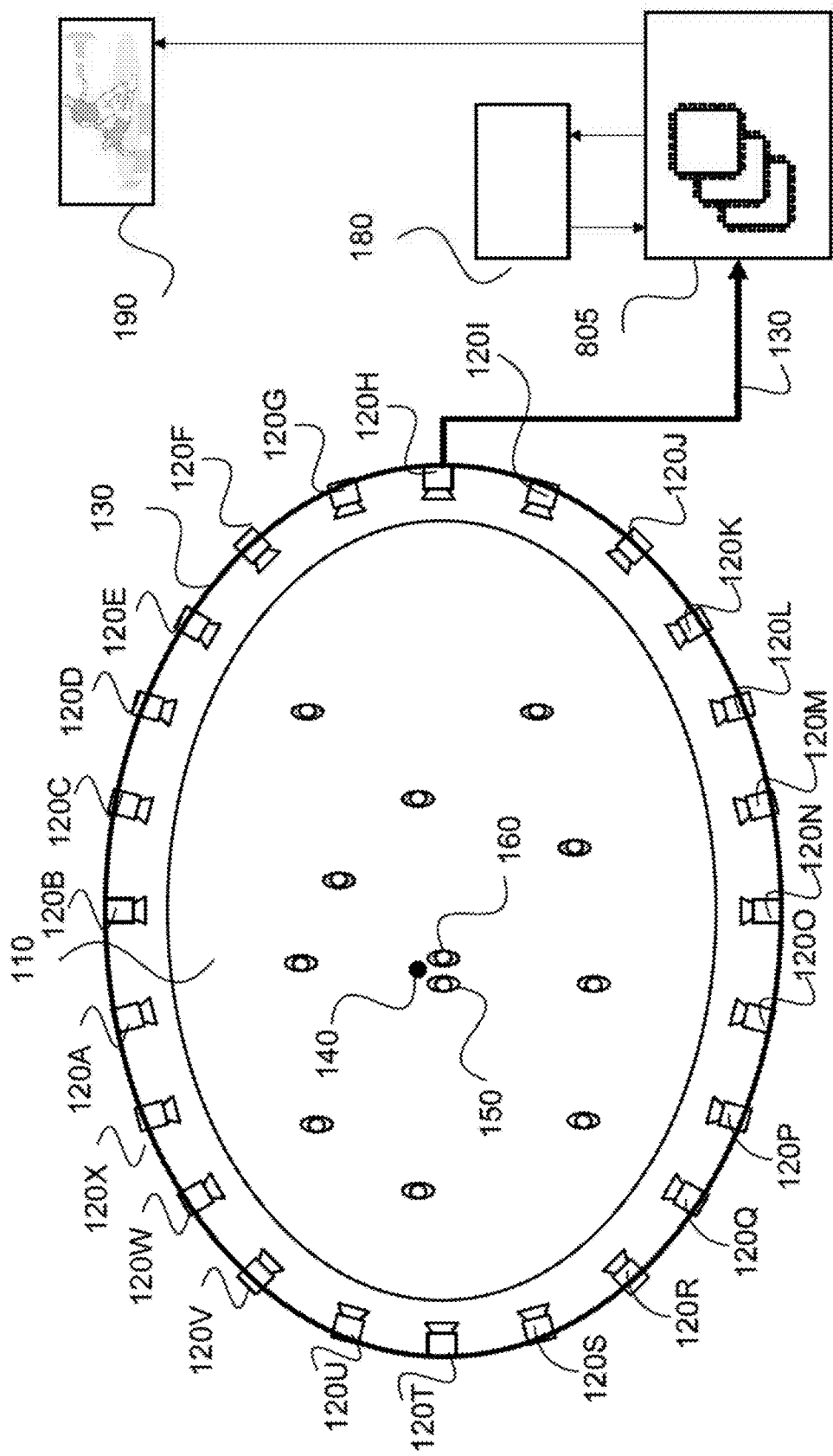
FIG. 1 is a schematic block diagram of a data processing architecture.

Where reference is made in any one or more of the accompanying drawings to steps and/or features, which have the same reference numerals, those steps and/or features have for the purposes of this description the same function(s) or operation(s), unless the contrary intention appears.

Arrangements described herein are adapted for use in the context of a sports or similar performance arena as shown for example in FIG. 1. As seen in FIG. 1, arena 110 is assumed to be centred on a playing field that is approximately rectangular, oval or circular, allowing the arena 110 to be surrounded by one or more rings of cameras 120A-120X. As seen in FIG. 1, the arena 110 includes a single ring of cameras 120A-120X. Each of the cameras 120A-120X is located at a respective predetermined location with respect to the arena 110. The arena 110, in the example of FIG. 1, contains players from a first team (e.g. 150) and a second team (e.g. 160) and a ball 140. The player 150 may be represented by a first object, the player 160 may be represented by a second object and the ball 140 by a third object.

The cameras 120A-120X of the ring of cameras shown in FIG. 1 are synchronised to capture frames at the same instants in time so that all points on the playing field defined by the arena 110 are captured simultaneously from a large number of viewpoints.

In some variations, the full ring of cameras as shown in FIG. 1 is not employed but rather some subsets of the full perimeter are employed. An arrangement where the full ring of cameras is not employed may be advantageous when certain viewpoints are known to be unnecessary ahead of time.

Figure 8A:
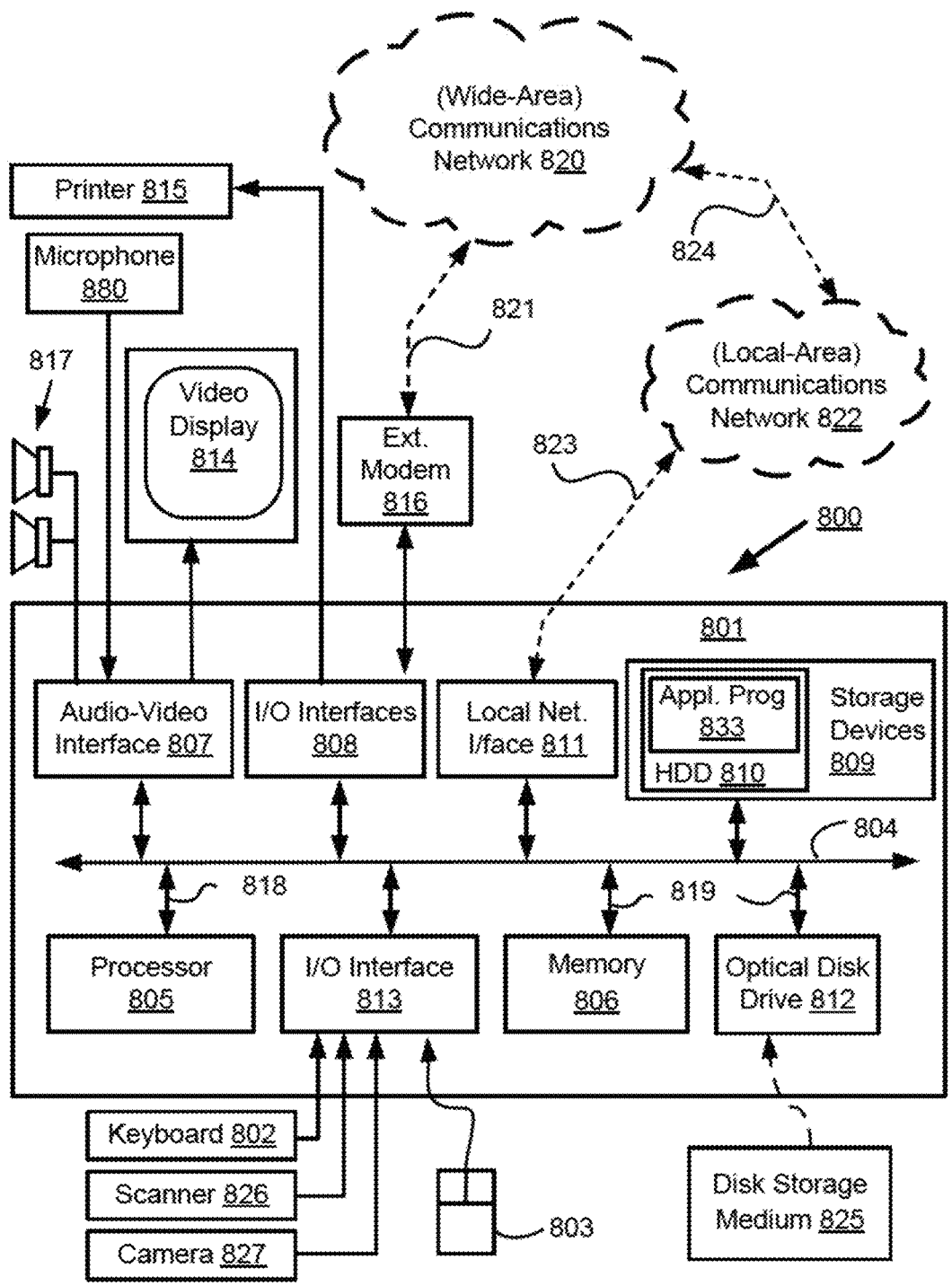
FIGS. 8A and 8B form a schematic block diagram of a general-purpose computer system upon which arrangements described can be practiced.

Video frames captured by a camera, such as the camera 120A, are subject to processing and temporary storage near the camera 120A prior to being made available, via a network connection 130, to a processing unit 805 (see FIGS. 8A and 8B) configured for performing computational video processing. As seen in FIG. 8A, the processing unit 805 is configured within a computer module 801. However, in an alternative arrangement, a separate video processing unit may be used to implement the described arrangements.

The processing unit 805 receives controlling input from a controller 180 that specifies the position, orientation, zoom and possibly other simulated camera features for a virtual camera within the arena 110. The processing unit 805 may be configured to synthesise a specified virtual camera perspective 190 based on video streams available to the processing unit 805 from the cameras 120A-120X surrounding the arena 110.

"Virtual cameras" are referred to as virtual cameras because the functionality of a virtual camera is computationally derived by methods such as interpolation between cameras or by rendering from a modelled three-dimensional (3D) scene constructed using data from many physical cameras surrounding the scene, rather than simply the output of any single physical camera.

A virtual camera location input may be generated by a human virtual camera operator and be based on input from a user interface device such as a joystick, mouse 803 (see FIG. 8A) or similar controller including dedicated controllers comprising multiple input components. Alternatively, the camera position may be generated fully automatically based on analysis of game play. Hybrid control configurations are also possible whereby some aspects of the camera positioning are directed by a human operator and others by an automated algorithm. For example, coarse positioning may be performed by a human operator and fine positioning, including stabilisation and path smoothing, may be performed by an automated algorithm.

The processing unit 805 may be configured to achieve frame synthesis using any suitable image based rendering method. Image based rendering methods may be based on sampling pixel data from a set of cameras of know geometric arrangement and combining the sampled pixel data into a synthesised frame. In addition to sample based rendering of a requested frame the processing unit 805 may also be configured to perform synthesis, 3D modelling, in-painting or interpolation of regions as required covering sampling deficiencies and to create frames of high quality visual appearance. The processing unit 805 may also be configured to provide feedback in the form of the frame quality or the completeness of camera coverage for the requested viewpoint so that the device generating the camera position control signal can be aware of the practical bounds of the processing unit 805. Video streams 190 created by the processing unit 805 may subsequently be provided to a production desk (not depicted) where the video streams 190 can be edited together to form a broadcast video. Alternatively, the video streams 190 may be broadcast unedited or stored for later compilation.

Figure 8B:
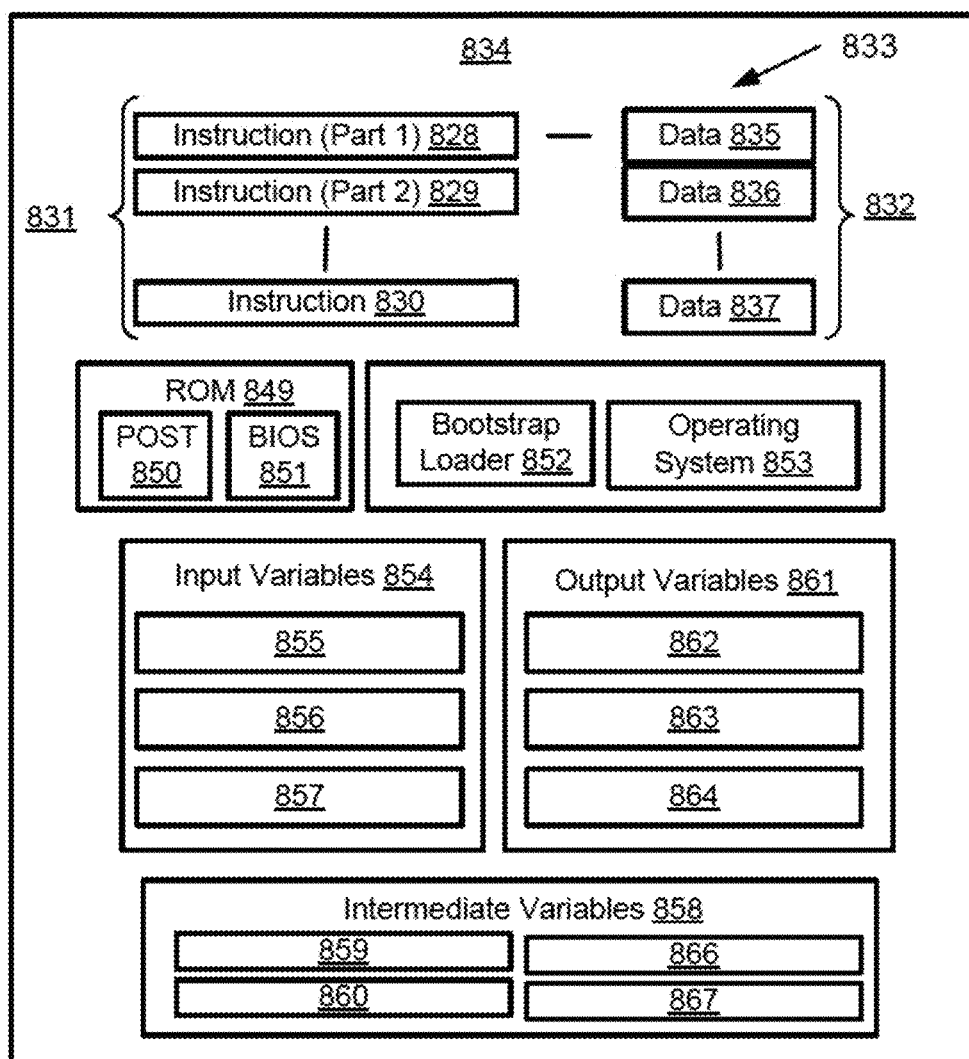
Figure 8B:
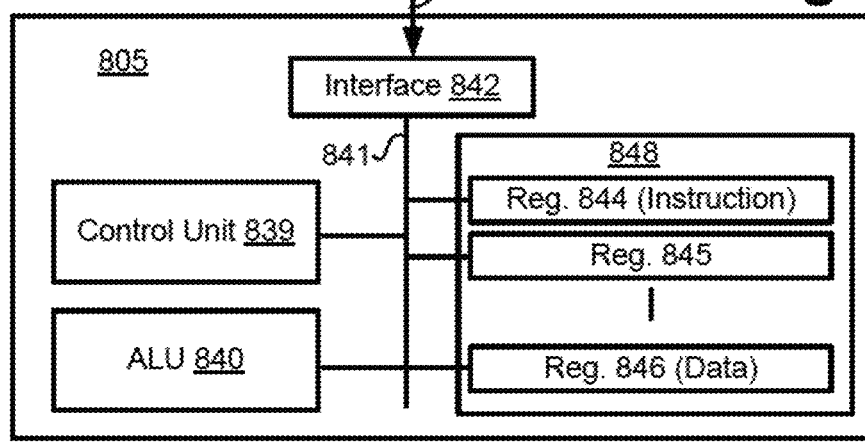

FIGS. 8A and 8B depict a general-purpose computer system 800, upon which the various arrangements described can be practiced.

As seen in FIG. 8A, the computer system 800 includes: the computer module 801; input devices such as a keyboard 802, a mouse pointer device 803, a scanner 826, a camera 120A-120X, and a microphone 880; and output devices including a printer 815, a display device 814 and loudspeakers 817. An external Modulator-Demodulator (Modem) transceiver device 816 may be used by the computer module 801 for communicating to and from a communications network 820 via a connection 821. The communications network 820 may be a wide-area network (WAN), such as the Internet, a cellular telecommunications network, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the communications network 820.

The computer module 801 typically includes at least the processing unit 805, and a memory unit 806. For example, the memory unit 806 may have semiconductor random access memory (RAM) and semiconductor read only memory (ROM). The computer module 801 also includes an number of input/output (I/O) interfaces including: an audio-video interface 807 that couples to the video display 814, loudspeakers 817 and microphone 880; an I/O interface 813 that couples to the keyboard 802, mouse 803, scanner 826, camera 827 and optionally a joystick or other human interface device (not illustrated); and an interface 808 for the external modem 816 and printer 815. In some implementations, the modem 816 may be incorporated within the computer module 801, for example within the interface 808. The computer module 801 also has a local network interface 811, which permits coupling of the computer system 800 via a connection 823 to a local-area communications network 822, known as a Local Area Network (LAN). As illustrated in FIG. 8A, the local communications network 822 may also couple to the wide network 820 via a connection 824, which would typically include a so-called "firewall" device or device of similar functionality. The local network interface 811 may comprise an Ethernet circuit card, a Bluetooth® wireless arrangement or an IEEE 802.11 wireless arrangement; however, numerous other types of interfaces may be practised for the interface 811.

The I/O interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 800.

The components 805 to 813 and 170 of the computer module 801 typically communicate via an interconnected bus 804 and in a manner that results in a conventional mode of operation of the computer system 800 known to those in the relevant art. For example, the processor 805 is coupled to the system bus 804 using a connection 818. Likewise, the memory 806 and optical disk drive 812 are coupled to the system bus 804 by connections 819. Examples of computers on which the described arrangements can be practised include IBM-PC's and compatibles, Sun Sparcstations, Apple Mac™ or like computer systems.

Methods described herein may be implemented using the computer system 800 wherein the processes of FIGS. 3 to 7 and 9 to 22 to be described, may be implemented as one or more software application programs 833 executable within the computer system 800. In particular, the steps of the described methods are effected by instructions 831 (see FIG. 8B) in the software 833 that are carried out within the computer system 800. The software instructions 831 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 833 is typically stored in the HDD 810 or the memory 806. The software is loaded into the computer system 800 from the computer readable medium, and then executed by the computer system 800. Thus, for example, the software 833 may be stored on an optically readable disk storage medium (e.g., CD-ROM) 825 that is read by the optical disk drive 812. A computer readable medium having such software or computer program recorded on the computer readable medium is a computer program product. The use of the computer program product in the computer system 800 preferably effects an advantageous apparatus for implementing the described methods.

In some instances, the application programs 833 may be supplied to the user encoded on one or more CD-ROMs 825 and read via the corresponding drive 812, or alternatively may be read by the user from the networks 820 or 822. Still further, the software can also be loaded into the computer system 800 from other computer readable media. Computer readable storage media refers to any non-transitory tangible storage medium that provides recorded instructions and/or data to the computer system 800 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 801. Examples of transitory or non-tangible computer readable transmission media that may also participate in the provision of software, application programs, instructions and/or data to the computer module 801 include radio or infra-red transmission channels as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory modules (including the HDD 809 and semiconductor memory 806) that can be accessed by the computer module 801 in FIG. 8A.

When the computer module 801 is initially powered up, a power-on self-test (POST) program 850 executes. The POST program 850 is typically stored in a ROM 849 of the semiconductor memory 806 of FIG. 8A. A hardware device such as the ROM 849 storing software is sometimes referred to as firmware. The POST program 850 examines hardware within the computer module 801 to ensure proper functioning and typically checks the processor 805, the memory 834 (809, 806), and a basic input-output systems software (BIOS) module 851, also typically stored in the ROM 849, for correct operation. Once the POST program 850 has run successfully, the BIOS 851 activates the hard disk drive 810 of FIG. 8A. Activation of the hard disk drive 810 causes a bootstrap loader program 852 that is resident on the hard disk drive 810 to execute via the processor 805. This loads an operating system 853 into the RAM memory 806, upon which the operating system 853 commences operation. The operating system 853 is a system level application, executable by the processor 805, to fulfil various high level functions, including processor management, memory management, device management, storage management, software application interface, and generic user interface.

The operating system 853 manages the memory 834 (809, 806) to ensure that each process or application running on the computer module 801 has sufficient memory in which to execute without colliding with memory allocated to another process. Furthermore, the different types of memory available in the system 800 of FIG. 8A must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

As shown in FIG. 8B, the processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal busses 841 functionally interconnect these functional modules. The processor 805 typically also has one or more interfaces 842 for communicating with external devices via the system bus 804, using a connection 818. The memory 834 is coupled to the bus 804 using a connection 819.

The application program 833 includes a sequence of instructions 831 that may include conditional branch and loop instructions. The program 833 may also include data 832 which is used in execution of the program 833. The instructions 831 and the data 832 are stored in memory locations 828, 829, 830 and 835, 836, 837, respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828 and 829.

In general, the processor 805 is given a set of instructions which are executed therein. The processor 805 waits for a subsequent input, to which the processor 805 reacts to by executing another set of instructions. Each input may be provided from one or more of a number of sources, including data generated by one or more of the input devices 802, 803, data received from an external source across one of the networks 820, 802, data retrieved from one of the storage devices 806, 809 or data retrieved from a storage medium 825 inserted into the corresponding reader 812, all depicted in FIG. 8A. The execution of a set of the instructions may in some cases result in output of data. Execution may also involve storing data or variables to the memory 834.

The disclosed arrangements use input variables 854, which are stored in the memory 834 in corresponding memory locations 855, 856, 857. The disclosed arrangements produce output variables 861, which are stored in the memory 834 in corresponding memory locations 862, 863, 864. Intermediate variables 858 may be stored in memory locations 859, 860, 866 and 867.

Referring to the processor 805 of FIG. 8B, the registers 844, 845, 846, the arithmetic logic unit (ALU) 840, and the control unit 839 work together to perform sequences of micro-operations needed to perform "fetch, decode, and execute" cycles for every instruction in the instruction set making up the program 833. Each fetch, decode, and execute cycle comprises:

a fetch operation, which fetches or reads an instruction 831 from a memory location 828, 829, 830;

a decode operation in which the control unit 839 determines which instruction has been fetched; and an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Figure 3A:
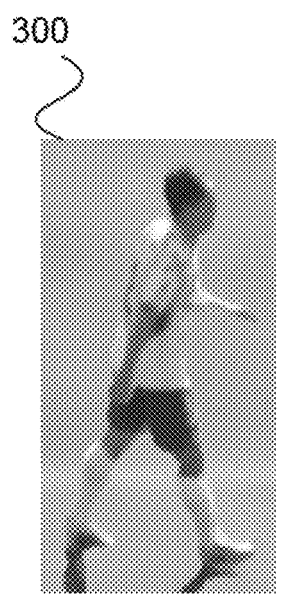
FIG. 3A is an image of reasonable quality.
Figure 3B:
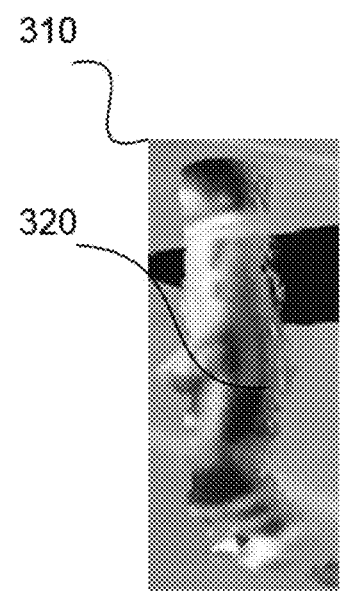
FIG. 3B is an image including rendering artefacts.
Figure 3C:
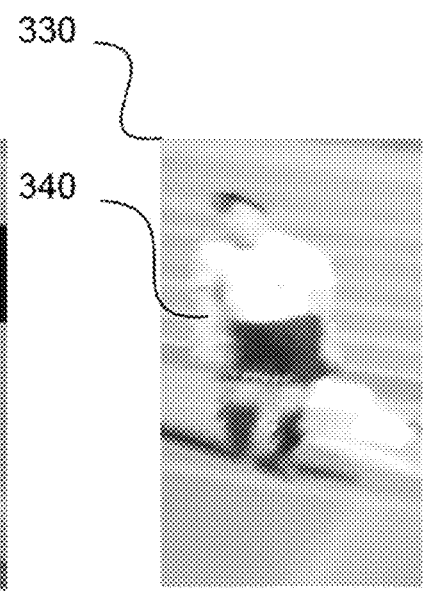
FIG. 3C is an image including degraded resolution.
Figure 3D:
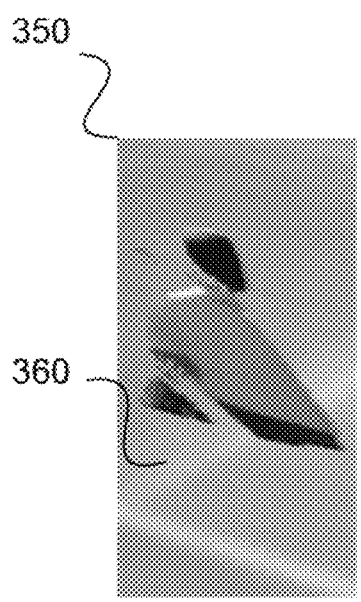
FIG. 3D is an image of a player with missing legs.
Figure 3E:
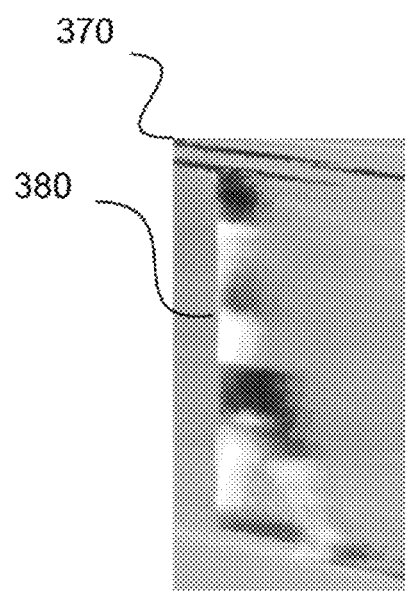
FIG. 3E is an image showing only one side of a player.
Figure 3F:
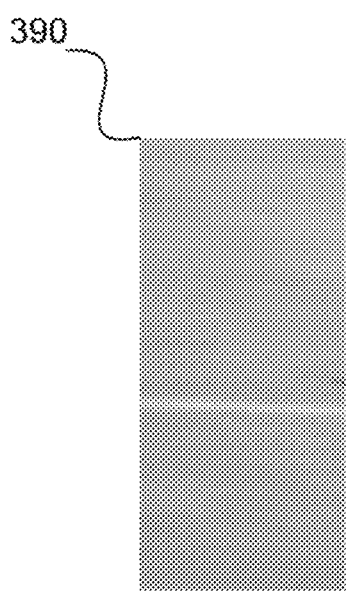
FIG. 3F is an image with an empty rendering.
Figure 4:
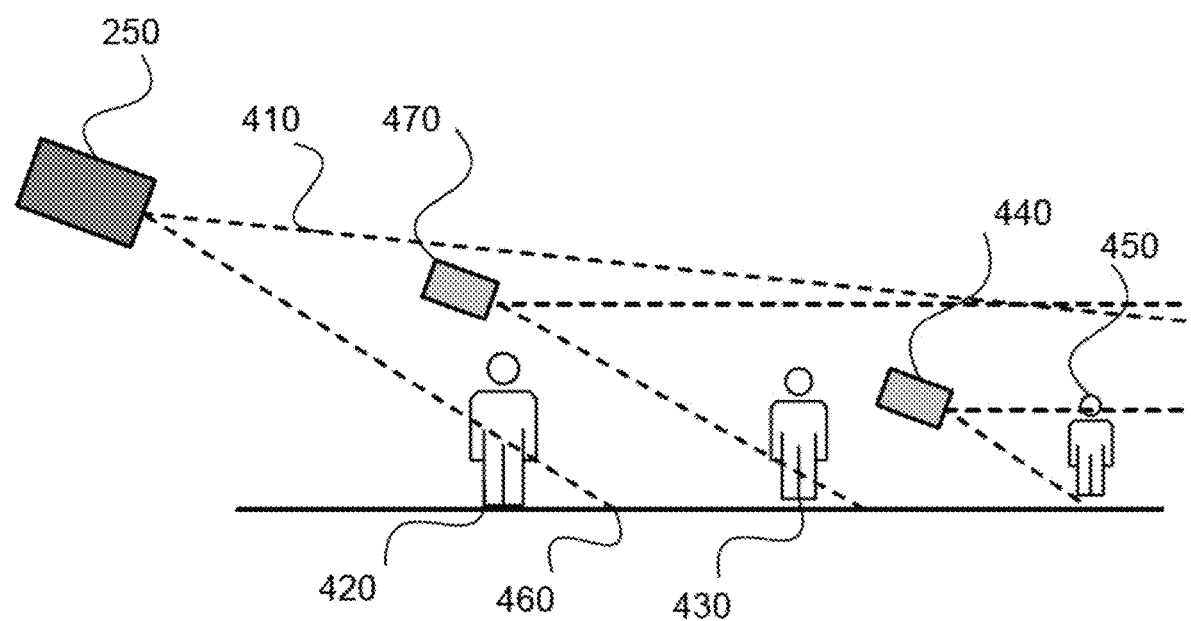
FIG. 4 is a schematic diagram showing the relationship of a physical video camera frustum with a ground plane.
Figure 5:
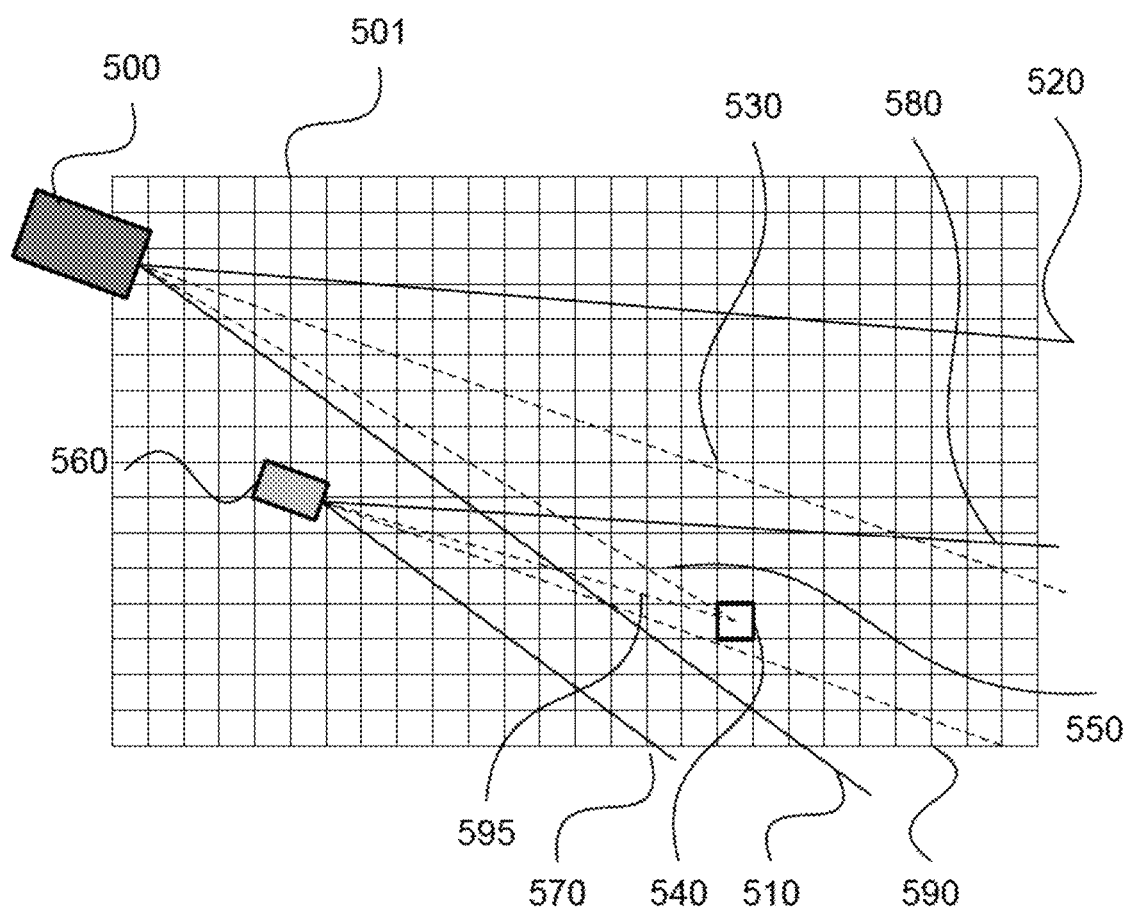
FIG. 5 is a schematic diagram showing a top down perspective of a physical video camera frustum overlaid on a ground plane that has been partitioned into a grid structure.

Each step or sub-process in the processes of FIGS. 3 to 5 is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The described methods may alternatively be implemented in dedicated hardware such as one or more integrated circuits performing the functions or sub functions of the described arrangements. For example, the described methods may be implemented using dedicated hardware forming a video processing unit. Such dedicated hardware may include graphic processors, digital signal processors, or one or more microprocessors and associated memories.

Despite unexpected physical video camera failure, virtual camera footage may still be produced. However, video quality requirements may mean that some points of view need to be avoided. Each outage may be evaluated to determine the effect on view quality and provide methods to manage the conditions.

One factor that contributes to reduction in quality of virtual camera rendering is perspective error. The greater the angular distance between an available physical camera perspective on a point in the scene and a virtual camera perspective on that same point in the scene, the greater the perspective transform error. Perspective error may be minimal for objects in the scene with simple convex hull geometric shapes (e.g., a square box). However, for irregular shapes like humans, there will be folds in clothing, areas between limbs and torso, ridges and grooves that are an expected part of the view from the virtual camera point of view for which there is no available data from physical video cameras. Increasing perspective error will at some scale result in visual artefacts in the virtual camera rendering of a scale that human viewers will judge to be distracting and poor quality.

Another factor that contributes to reduction in quality of virtual camera rendering is resolution error. Every point in the scene that is to be rendered for a virtual camera view, may be constructed using supporting data from one or more of the physical cameras 120A-120X, each with some physical distance from the point in the scene. At each scene point visible from a physical video camera, an available resolution per pixel may be determined. Similarly, a required resolution for that same scene point in the view to be rendered may be determined for the virtual camera. The ratio of available physical camera resolution to required virtual camera resolution for each visible scene point acts as a limiting factor to the resolution quality of the resulting virtual camera rendered perspective. A physical camera resolution to virtual camera resolution ratio of 1.0 may be considered as close to optimal. A physical camera resolution to virtual camera resolution ratio of 2.0 means that the physical video camera may provide double the required resolution. A physical camera resolution to virtual camera resolution ratio of 0.5 means that the physical video camera can only provide half the required resolution, so quality would be poor for a ratio of 0.5. Poor quality as a result of insufficient resolution may appear pixelated or blurry, depending on the rendering algorithm.

Other sources of error that propagate into rendering quality according to the physical camera geometry relative to the virtual camera point of view, may be covered by the described methods. Such other sources of error relate to the virtual camera management in relation to propagation of error through the structure of the physical camera geometry relative to the virtual camera point of view.

Error propagated from the physical camera geometry relative to the virtual camera point of view, varies from point to point across the virtual camera view of the scene. Some parts of the virtual camera view are rendered with data that originates from different physical cameras than other points in the same image. Sources of perspective and resolution error both vary across the same virtual camera view in the same rendered frame, resulting in a highly complex geometry of error propagation.

Deploying enough physical video cameras to capture the entire field volume with three-hundred and sixty (360) degrees of coverage may be excessively expensive. As a result, it may be common to choose a small subset of volumetric regions on the field and deploy a more moderate number of cameras to cover those volumetric regions. The physical video cameras surrounding the selected target volumes of interest may look through those regions, thereby also covering surrounding regions but with lesser resolution and limited perspective.

Figure 2:
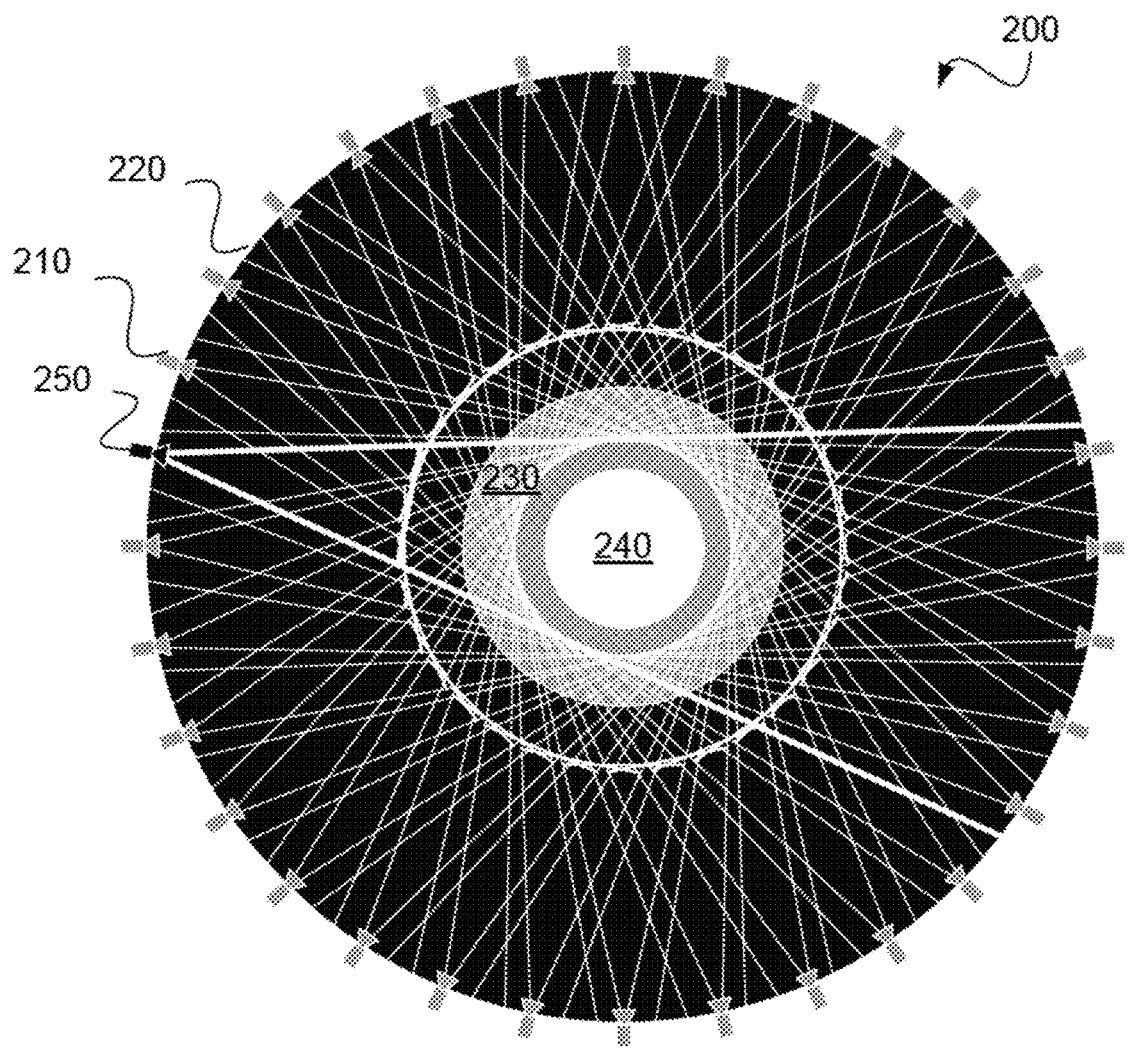
FIG. 2 is a schematic diagram showing a top down view of a field surrounded by physical video cameras directed at a common volume of interest as part of an overall volumetric space.

FIG. 2 is a schematic diagram showing a top down view 200 of a field surrounded by a ring of physical video cameras (e.g., 210, 250) directed at a common volumetric region of interest as part of an overall volumetric space. The view 200 shows the geometry involved when the ring of physical video cameras is pointed at the common volumetric region of the field. Physical video cameras such as cameras 210 and 250 are arranged around the outside of the field and mounted in the stadium surrounds looking down across the field.

In practice, the physical video camera deployments are never as geometrically perfect as the cameras (e.g., 210, 250) seen in FIG. 2. However, groups of physical video cameras spread around a stadium will be directed towards a common volumetric region of interest on the field as in FIG. 2. Having a ring of physical video cameras directed to a common volumetric region, as in FIG. 2, produces three concentric rings with differing qualities in terms of their use in virtual camera reproduction of the scene.

As seen in FIG. 2, the inner circle 240 represents a ground region that is covered by a sufficient spread of physical camera views that should support virtual camera rendering of the region 240 from any desired pan angle. A virtual camera looking into/through/out of region 240 will have one or more supporting physical cameras that can provide the data required to render a perspective view of the region 240 with reasonable quality. FIGS. 3A to 3F include small images showing examples of rendering artefacts that may occur if a virtual camera is directed to points of view that are not adequately supported by data from physical video cameras. For example, FIG. 3A shows an image 300 of reasonable quality.

Ring region 230 surrounding the inner circle region 240 has less ubiquitous directional coverage than inner circle region 240. The outer edge of ring region 230 is where the lower edge of frustums of the physical video cameras intersects with the ground plane as will now be described by way of example with reference to FIG. 4. A frustum is a three-dimensional 3d pyramid shape formed by a field of view projecting forward from a virtual camera into scenery.

In a view from the side, as seen in FIG. 4, the lower edge of frustum 410 of camera 250 intersects the ground plane at 460. A virtual camera looking at ring region 230 from a direction closely aligned with one of the many physical video cameras (e.g., 210, 220) would have the requisite physical camera input data to render the side view shown in FIG. 4 with physical video camera 250 having a view of player 430. However, a virtual camera attempting to look tangentially to ring region 230 will not have the supporting data from physical cameras necessary for rendering the virtual camera perspective, producing results including rendering artefacts 320 as shown for example in image 310 of FIG. 3B.

Any part of outer ring region 220 seen in FIG. 2 may be shown in the distance from the direction of a physical video camera (e.g., 250) on the opposite side of the field. For example, physical camera 250 provides data for a view of the field through the centre region 240 and across to the far-right side of the field. A virtual camera looking from a similar perspective may render objects on the far-right side of the field. However, the virtual camera can only render the objects on the far-right side of the field with limited resolution since the physical video camera 250 is so distant from the far-right side region. In the example of FIG. 4, virtual camera 470 is attempting to render a view of person 450 using data captured by physical video camera 250. The view of person 450 captured by the virtual camera 440 would have badly degraded resolution (e.g., similar to the degraded resolution shown in image 330 of FIG. 3C) due to large difference between industry standard resolution expectations (e.g. 1080p) in the virtual camera and the available resolution from the more distant physical camera 250.

In the example of FIG. 4, a virtual camera attempting to view the ground region near to physical video camera 250 and from the same direction as physical video camera 250 may have none of the data required to support the render of the ground region. Alternatively, the virtual camera attempting to view the ground region near to physical video camera 250 is looking over the black circular region 220.

In the example of FIG. 4, artefacts such as missing legs 360 on players, as seen for example in image 350 of FIG. 3D, may occur. The person 420 in FIG. 4 may be rendered with missing legs. Players that are even closer to the extreme edge of the field (e.g., player 430), if viewed from the side may only have data available for one side of the player (e.g., as shown in image 370 of FIG. 3E) or when viewed from field side, there may be no data available at all, resulting in an empty rendering with no player at all (e.g., as shown in image 390 of FIG. 3F). Where only one ring of physical video cameras has been deployed to establish a single volume of interest on a field, better quality virtual camera rendering may be achieved when viewing a scene by looking into or through the volume of interest. In practice however, aesthetic judgements, the need to follow ongoing plays in the game and other similar concerns mean that compromises will be made. The complexity of making those compromises may be high.

In one of the methods described below, there is provided a visualisation of the geometry of error propagation from physical video camera capture to virtual video camera rendering as the captured video is projected onto a scene. View quality visualisation may be updated on every video frame or whenever there is a change in either virtual camera position and/or orientation. View quality visualisation may be updated whenever there is a change in deployment configuration or availability of supporting physical video cameras.

In most sports stadiums, the main camera targets are players running around on the ground. A virtual camera has a frustum. As described above, a frustum is the three-dimensional (3d) pyramid shape formed by the field of view projecting forward from the virtual camera into scenery. Areas at an intersection of the virtual camera frustum with the ground plane may be considered as a main area of concern for video quality. An area at the intersection of the virtual camera frustum and other planes parallel and slightly above the ground plane may also be considered. For example, view quality at leg and face height for players on a field may be considered. In the example of FIG. 4, player 420 would have different visibility at ground height rather than head height.

For purposes of determining available view quality across a field, the whole field may be modelled as a two-dimensional grid that may be called an available quality grid. FIG. 5 is a schematic diagram showing a top down perspective of a physical video camera frustum overlaid on a ground plane that has been partitioned into a grid structure 501. In the example of FIG. 5, multiple physical video cameras such as camera 500 are installed with a view of a field. The view of the field is represented by lines 510 and 520. Centre line 530 represents pan angle of the physical video camera 500. A view quality grid 501 is defined, to cover the overall target field area. Each grid square (e.g., 540) has a pan angle, such as line 550, relative to physical camera pan angle line 530 and a distance from the physical video camera 500. The pan angle may be pre-determined based on installed and calibrated physical video cameras spread around the field as shown in FIG. 1.

Virtual camera 560 seen in FIG. 5 has a field of view (i.e., as represented by lines 570 and 580) and a centre line 590. Virtual camera 560, based on the field of view, also includes a view of grid square 540. Virtual camera 560 has a pan angle 595 to grid square 540. If the pan angle from physical camera 500 to grid square 540 is a closest pan angle of all of deployed physical cameras to supporting a required virtual camera pan angle 595, then the angle between lines 550 and 595 represents the degree of perspective transformation that will be required to render the image from the perspective of virtual camera 560. Relative distances from physical camera 500 to the grid square 540 versus virtual camera 560 to grid square 540 represents a scaling factor that may be applied to compare the available resolution from physical camera 500 to the required resolution (e.g. 1080p) of the virtual camera 560.

Larger perspective transformations produce larger rendering errors. The significance of the error caused by any particular perspective transformation angle depends strongly on the qualities of the surfaces being captured/rendered, so that acceptable levels of perspective transformation should be provided as parameters for user control.

Physical camera 500 may have a much higher resolution than the intended resolution of the virtual cameras. For example, physical video camera 500 may have 4K resolution while virtual camera 560 may have 2K resolution. In this case, virtual camera 560 may be positioned at half the distance to target square 540 as compared to physical video camera 500, and still render objects in that square at full 2K resolution.

The size of each available quality grid cell may vary depending on the required resolution of the virtual camera view quality model to be determined. For each grid square of the available quality grid, assuming a simple digital pinhole camera model, given each physical video camera position, orientation, zoom and pixel density, if the grid square is visible from that physical video camera, the pan and tilt angles from the physical video camera to the grid square are recorded. The available resolution at the grid square is also recorded as metres per pixel. Determination of available quality grid is performed initially during system start-up and calibration. However, the available quality grid needs to be re-determined in the event that anything about the physical video camera array changes. In one implementation, light levels, aperture, focus and lens properties of the physical video cameras may also be accounted for to provide more detailed quality estimation of data available from each physical camera against each grid square. In another implementation, light levels, aperture, focus and lens properties capable of being simulated for the virtual camera may also be determined.

During virtual camera operation, knowing the position of the virtual camera, a graphical representation of the available grid quality relative to the virtual camera position may be determined. For each cell of the available quality grid 501, the pan and tilt angles from the virtual camera 560 to the centre point of the cell may be determined. The physical video camera that has a closest matching pan and tilt angle on that same cell in the available quality grid is then determined. The difference between the available pan and tilt angles to each cell of the physical camera verses the virtual camera represent the degree of perspective transformation required to be performed by the virtual camera renderer. Greater angles of perspective transform produce greater rendering errors so perspective transform angle is used as a measure of perspective transform error. The ratio of the required resolution for the virtual camera view over the available resolution at each cell in the available quality grid represents the proportion of the required resolution that may be provided at that grid position and will be used as a measure of resolution error.

Perspective transformation is the process of rendering an image that was originally captured from one perspective, as though the image was captured from another perspective. Small changes to perspective do not produce noticeable rendering errors. As the difference in perspective angle increases, so will perspective transformation error. In practice, the degree of visible perspective transformation error is quite subjective and sensitive to the surface properties of the rendered objects. Acceptable error levels may be determined for a given environment and audience, and classified as low, medium and high levels of perspective transformation error and associated with ranges of perspective transformation angles.

Perspective transformation error and resolution error may be presented in a variety of ways. One method of showing perspective transformation error is to show a different colour for different ranges of perspective transform angles to represent the severity of the transform. For example, green may be shown in each cell of the quality grid where the perspective transform angle is less than pi/16, red may be shown where the perspective transform angle is between pi/16 and pi/8, and black may be shown everywhere else. Showing a top-down view of the quality grid with colour selections per cell as described here, with an overlay of the current virtual camera position and an outline of intersection of the virtual camera frustum with the ground plane provides a good representation of the consequence of turning the virtual camera to look at different parts of the field from the current position. In one implementation, if low to moderate perspective transformation error is indicated by a cell showing green or red respectively, the degree of resolution error may be indicated, by altering the shade of green or red. A lighter shade of green indicates good resolution with low perspective error. Light green may be shown when the view through the current camera position both aligns well with an available physical camera and the available resolution is sufficient. A darker shade of green indicates poor resolution with minimal perspective error. Darker green cells may occur when the view through the current virtual camera position to the target cell aligns well with a physical camera perspective. However, the virtual camera may be much closer to the target than the physical camera and the relative resolutions may be insufficient to compensate. A similar meaning applies to lighter and darker reds except the perspective error is also larger. There is no reason to show shades of grey for high perspective error cells shown in black because the perspective error in those locations has already been determined to be so high that resolution error is meaningless.

The use of colours in the view quality overlay is a useful visualisation. However, other visualisations may also be applied to illustrate the same view quality data. For example, various shading patterns may be used as an alternative visualisation.

Figure 9:
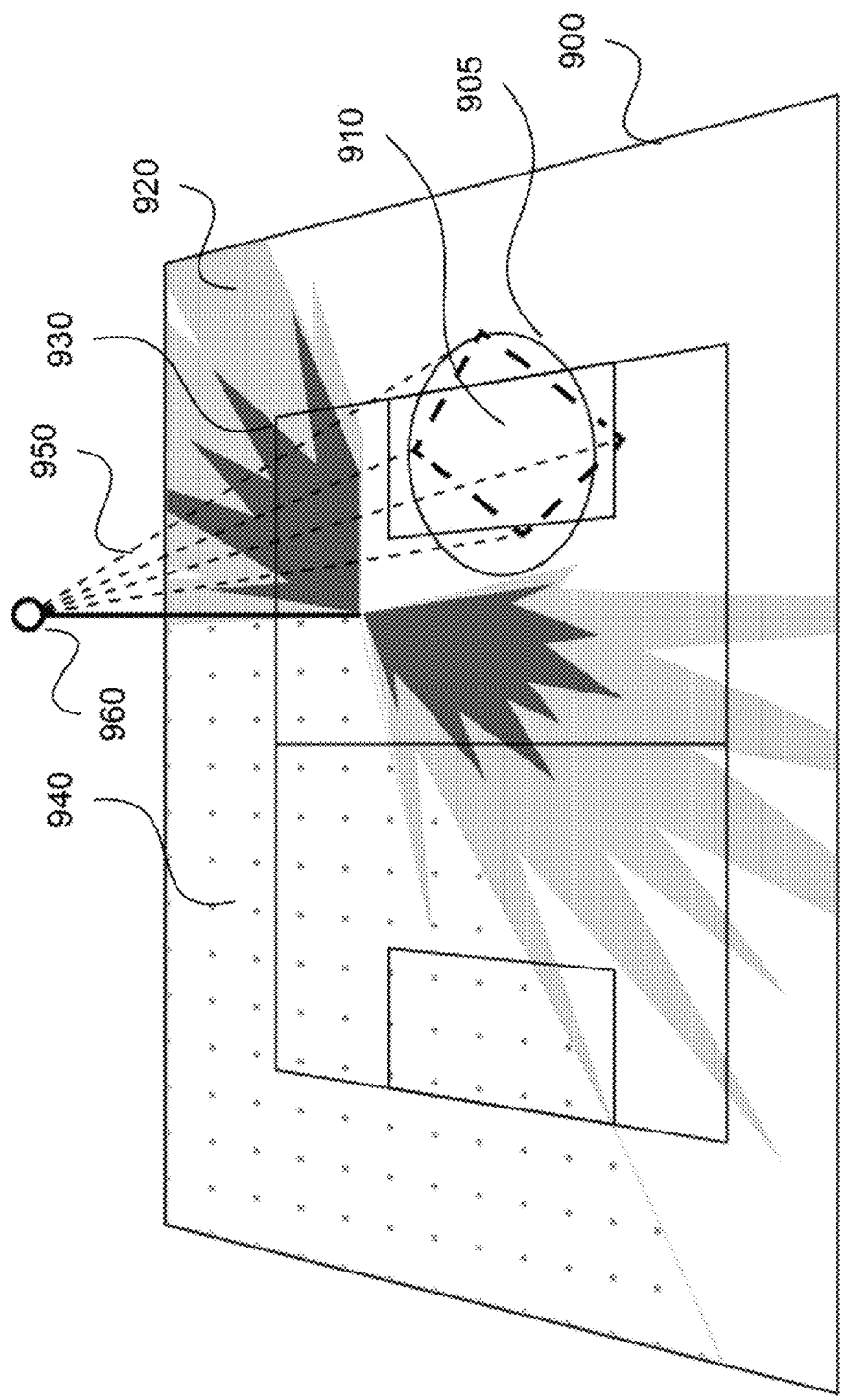
FIG. 9 is a schematic diagram to illustrate a view quality visualisation where a virtual camera is positioned high above a field but slightly outside of a volume of interest, and looking into the volume of interest.

View quality visualisation will now be described by way of example with reference to FIG. 9. FIG. 9 shows a virtual camera 960 positioned high above a field 900. The virtual camera 960 has an associated frustum 950 which intersects ground plane at point 910 of the playing field 900. In the example of FIG. 9, physical video cameras (not shown) surrounding the field 900 are directed towards a common volume of interest 905, on and above the ground near the right end of the field 900. The view of virtual camera 960 in the example of FIG. 9 would be of high quality as illustrated at 910 by the absence of shading. Surrounding regions which are lightly shaded in FIG. 9, such as region 920, would be likely to have rendering artefacts from perspective transformation. Darkly shaded regions, such as region 930, may have severe rendering problems if the virtual camera 960 were turned to look at those target areas with the virtual camera 960 remaining in its current position. Ground regions, such as region 940, would have little perspective transformation error because the ground regions are supported by physical camera views from the bottom right side of the field. However, the supporting physical video cameras would be a long way from ground region 940 relative to the virtual camera 960, leading to resolution issues, as illustrated by spotted shading as shown at region 940.

Figure 10:
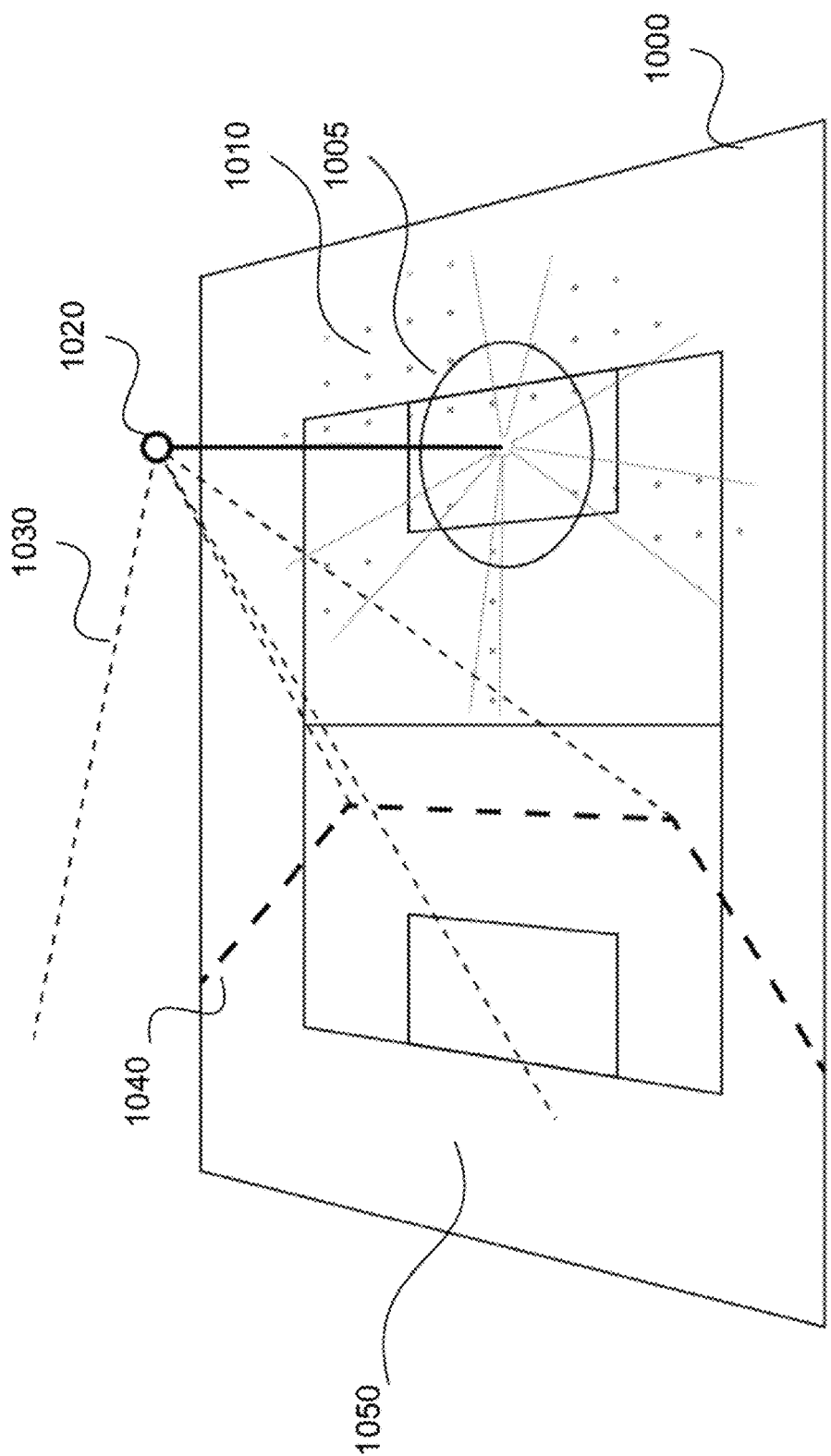
FIG. 10 is a schematic diagram to illustrate a view quality visualisation where the virtual camera is positioned high above a volume of interest, and looking away from the volume of interest.

View quality visualisation will now be further described by way of example with reference to FIG. 10. In the example of FIG. 10, a virtual camera 1020 is positioned high above a field 1000, directly over a volume of interest 1005 targeted by a physical video camera array (not shown). Virtual camera 1020 frustum 1030 intersects the ground plane at 1040 of playing field 1000. In the example of FIG. 10, the physical video cameras surrounding the field 1000 are directed towards a common volume of interest indicated by circle 1005, on and above the ground near the right end of the field. The illustrated view of virtual camera 1020 in the example of FIG. 10 would be of high quality as illustrated at 1050 by clear shading. Surrounding regions lightly shaded (e.g., region 1010) would be likely to have rendering error from resolution limits due to the relative distances between the virtual camera 1020 and supporting physical video camera for those orientations, as illustrated by spotted shading in FIG. 10.

Figure 11:
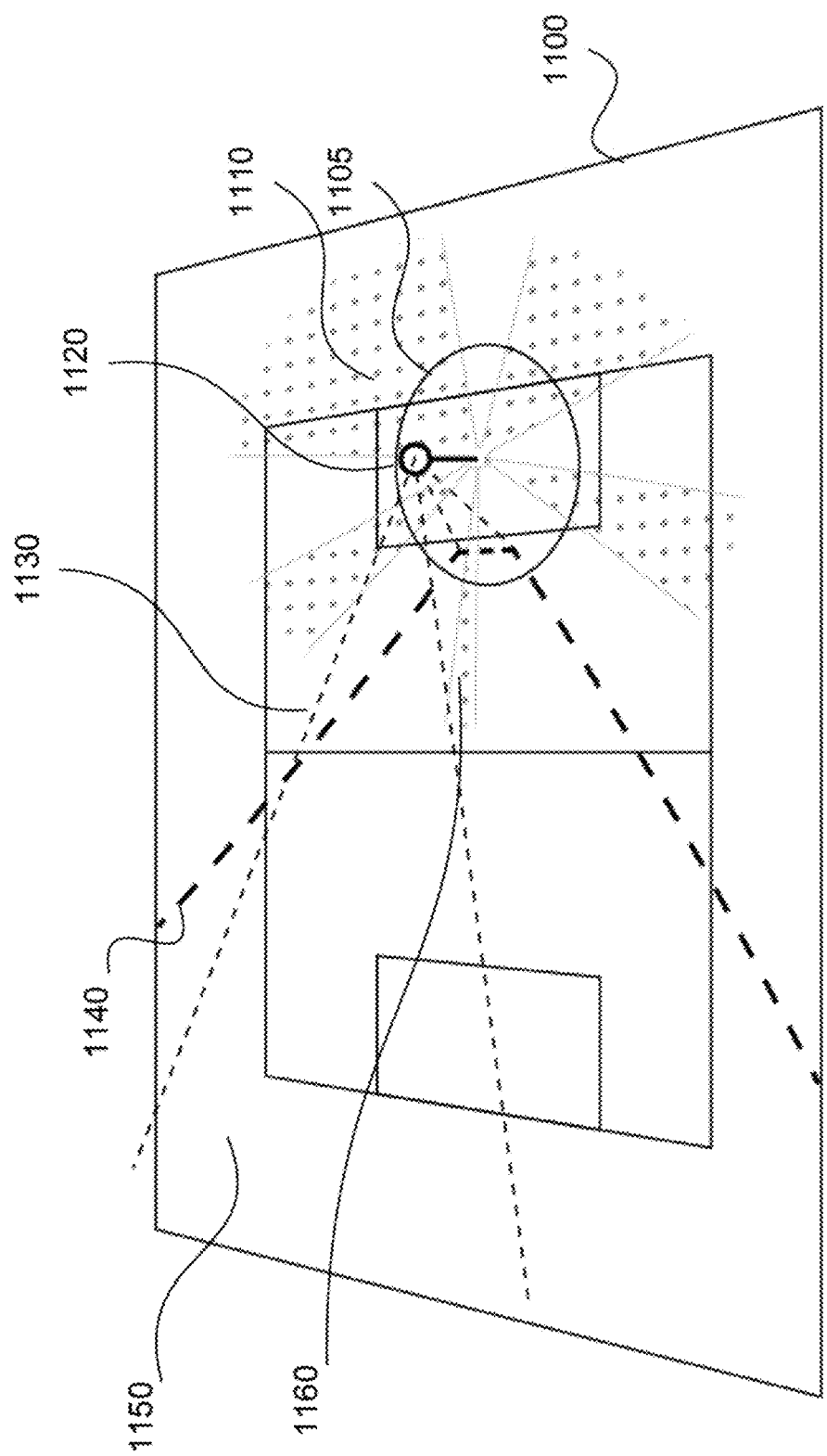
FIG. 11 is a schematic diagram to illustrate a view quality visualisation where a virtual camera is positioned low above a volume of interest, and looking away from the volume of interest.

View quality visualisation will now be further described by way of example with reference to FIG. 11. In the example of FIG. 11, a virtual camera 1120 is positioned low above field 1100, directly over a volume of interest 1105 targeted by a physical video camera array (now shown). Virtual camera 1120 frustum 1130 intersects the ground plane at 1140 of playing field 1100. In the example of FIG. 11, the physical video cameras surrounding the field 1100 are directed outward from a common volume of interest indicated by circle 1105, on and above the ground near the right end of the field. The illustrated view of virtual camera 1120 in the example of FIG. 11 would mostly be of high quality as illustrated at 1150 by clear shading, with exception of region 1160 that would suffer from slightly reduced resolution due to the relative distances of the virtual camera and supporting physical video cameras from that ground position, as illustrated by spotted shading in FIG. 11.

Figure 12:
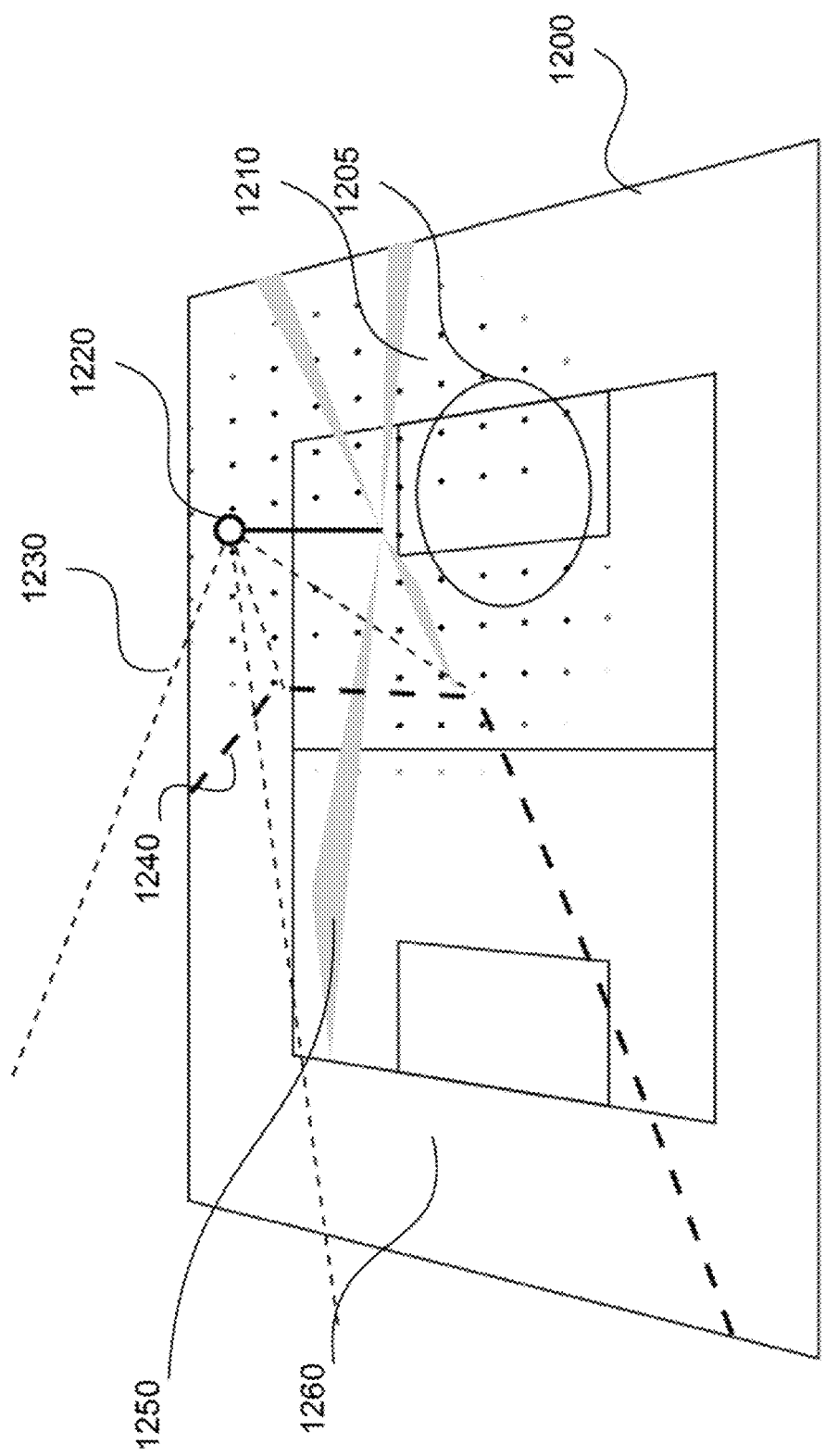
FIG. 12 is a schematic diagram to illustrate a view quality visualisation where a virtual camera is positioned at a moderate height above a field, but just outside a volume of interest, and looking away from the volume of interest.

View quality visualisation will now be further described by way of example with reference to FIG. 11. In the example of FIG. 11, virtual camera 1220 is positioned at a moderate height above field 1200, but just outside of a target volume of interest 1205 where physical video cameras (now shown) are primarily directed. Virtual camera 1220 frustum 1230 intersects the ground plane at 1240 of playing field 1200. In the example of FIG. 12, the physical video cameras surrounding the field 1200 had been directed at a tangent to a common volume of interest indicated by circle 1205, on and above the ground near the right end of the field. The illustrated view of virtual camera 1220 in the example of FIG. 12 would mostly be of high quality as illustrated at 1260 by clear shading, with the exception of slice region 1250 that would suffer from perspective transformation errors because there are no physical video cameras supporting the rendering of region 1250 of the virtual camera view without a significant perspective transformation. In the example of FIG. 12, there are no supporting physical video cameras because the physical video cameras are all set to look through the region of interest 1205 while the virtual camera 1220 is looking at a tangent to region 1205.

Figure 13:
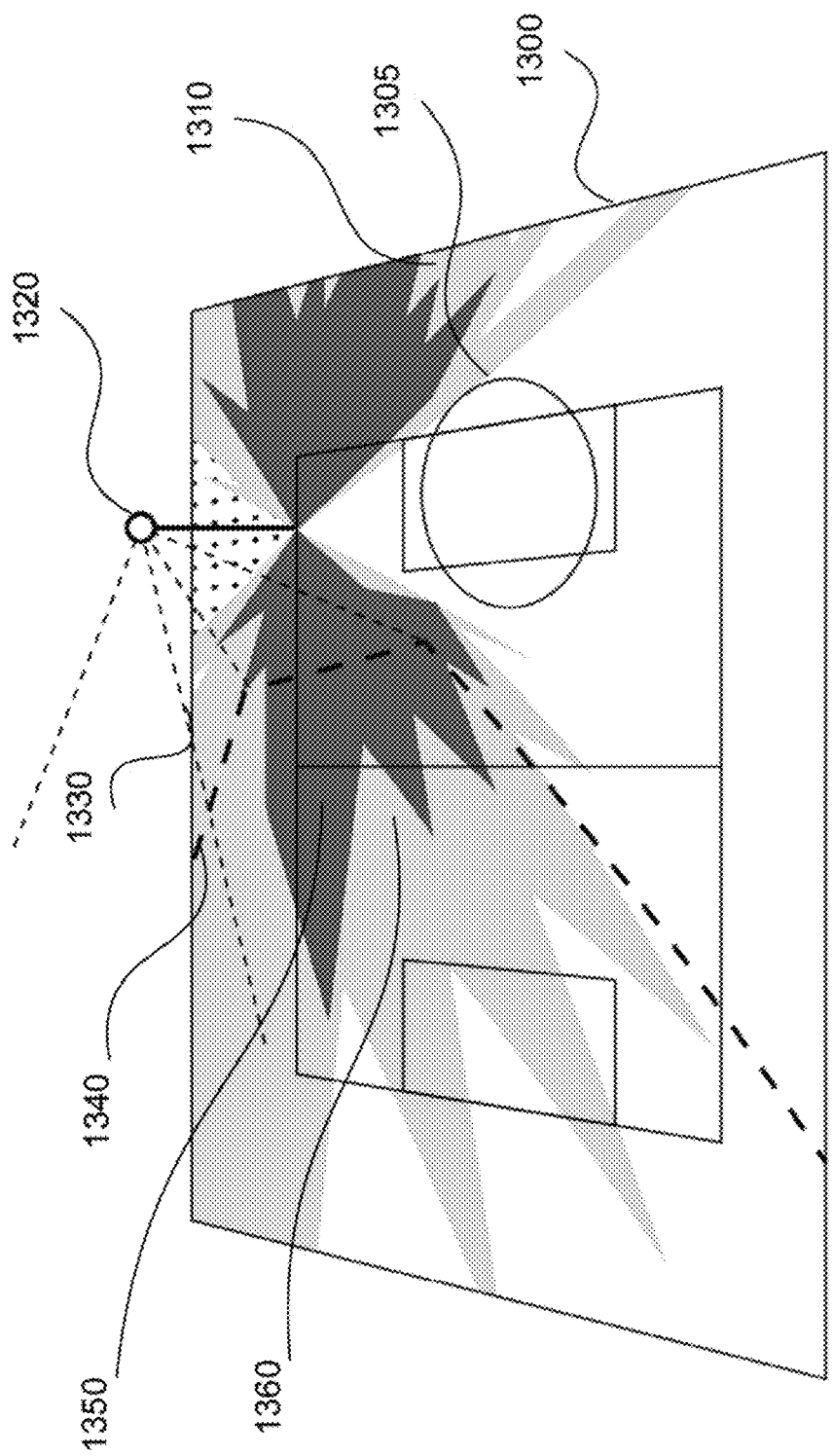
FIG. 13 is a schematic diagram to illustrate a view quality visualisation where a virtual camera is positioned at a moderate height above a field, but significantly outside of a volume of interest and looking to an adjacent region that is also outside of the volume of interest.

View quality visualisation will now be further described by way of example with reference to FIG. 13. In the example of FIG. 13, a virtual camera 1320 is positioned at a height above field 1300 but below supporting physical camera (not shown) heights, but also a long way outside of target volume of interest 1305 where the physical video cameras are primarily directed. Virtual camera 1320 frustum 1330 intersects the ground plane at 1340 of playing field 1300. In the example of FIG. 13, the physical video cameras surrounding the field 1300 are directed at a distant tangent to a common volume of interest indicated by circle 1305, on and above the ground near the right end of the field. The illustrated view of virtual camera 1320 in the example of FIG. 13 would be of very poor quality because there are no physical video cameras providing supporting image data with a perspective anywhere near what is required. The very poor quality of the view of virtual camera 1320 is indicated as severe in FIG. 13 by dark shaded areas such as area 1350 and moderate by lighter shaded areas such as area 1360.

Figure 14:
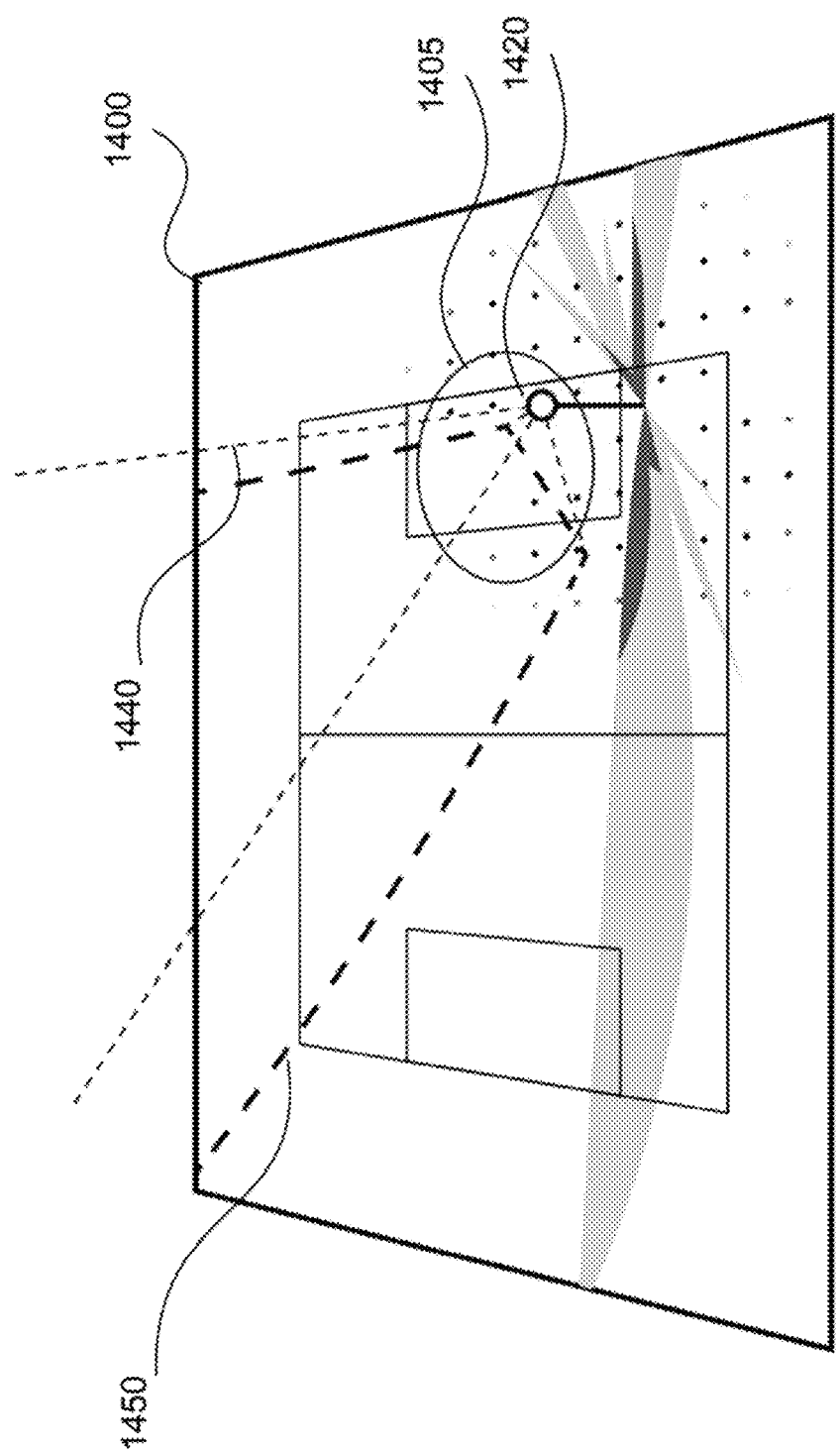
FIG. 14 is a schematic diagram to illustrate a view quality visualisation where a virtual camera is positioned at a moderate height above a field, but just slightly outside of a volume of interest and looking through the volume of interest towards the same ground area targeted in FIG. 13.

View quality visualisation will now be further described by way of example with reference to FIG. 14. In the example of FIG. 14, a virtual camera 1420 is positioned to look through a target volume of interest 1405 on field 1400, to view a similar area of the field 1400 outlined by broken lines 1450 of the field as virtual camera 1320 in FIG. 13. However, from the perspective of virtual camera 1420 there is far better quality data available from physical video cameras to support the view of FIG. 14, since the camera 1420 is looking through the target volume of interest 1405.

Figure 15:
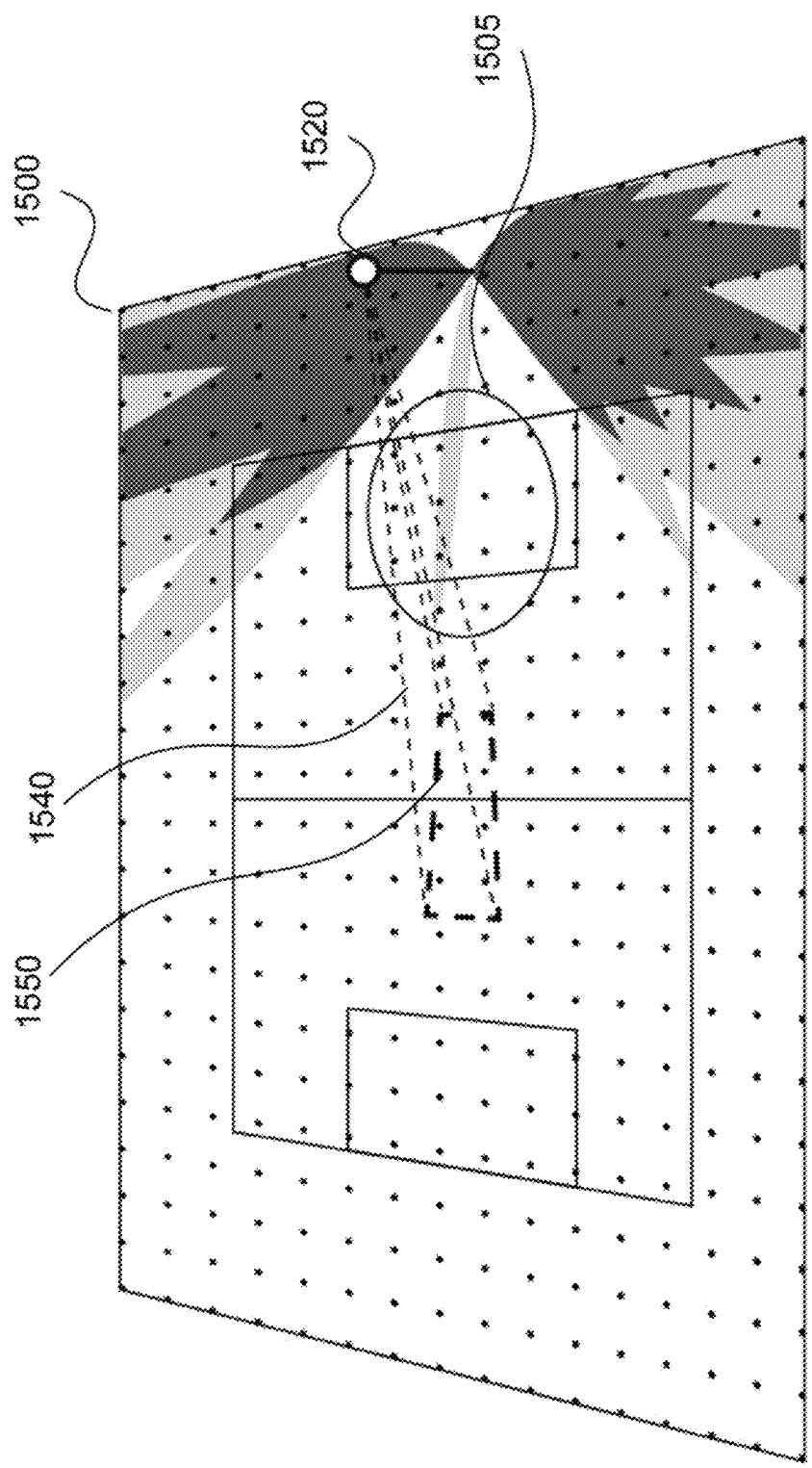
FIG. 15 is a schematic diagram to illustrate a view quality visualisation where a virtual camera is positioned at a moderate height above a field outside of a volume of interest, and looking through the volume of interest with a tight zoom to view a small region near centre field.

View quality visualisation will now be further described by way of example with reference to FIG. 15. In the example of FIG. 15, a virtual camera 1520 is positioned to look through a target volume of interest 1505 on field 1500 with a tight zoom 1540, to view a small region 1550 near centre field. Despite looking through the target volume of interest in the example of FIG. 15, the virtual camera zoom level means that required resolution (i.e., in metres per pixel) is significantly demanding that the required resolution cannot be provided by the physical video cameras. In the example of FIG. 11, the physical video cameras would be just behind the virtual camera position on the right, as illustrated by spotted shading on most of the field 1500.

Figure 16:
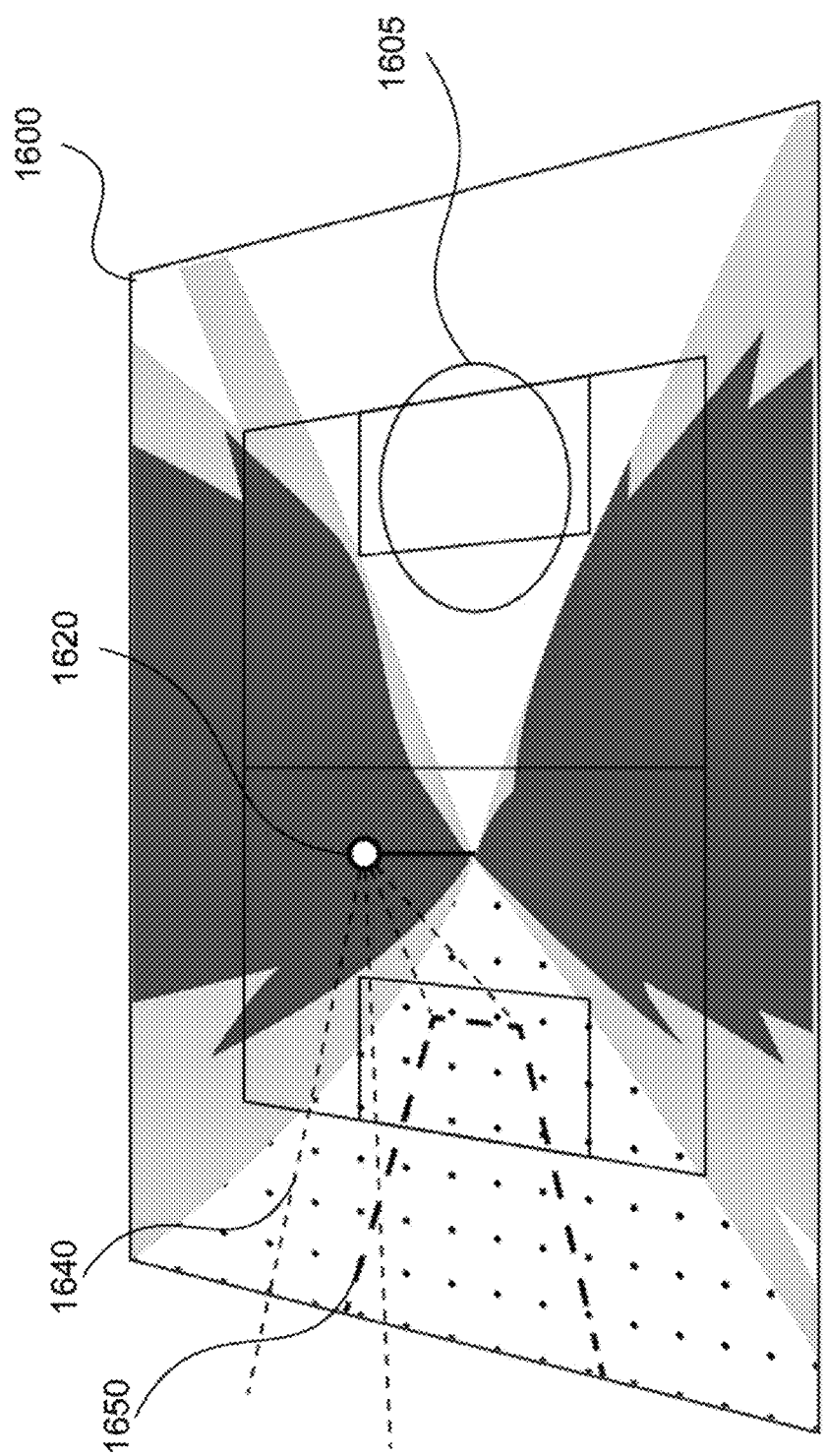
FIG. 16 is a schematic diagram to illustrate a view quality visualisation where a virtual camera is positioned well outside of a volume of interest, and looking away from a region of interest.

View quality visualisation will now be further described by way of example with reference to FIG. 16. In the example of FIG. 16, a virtual camera 1620 is positioned well past a target volume of interest 1605 and looking at an opposite end of field 1600 with the target volume of interest 1605 behind the camera 1620. In the example FIG. 16, there will be physical video cameras that support the perspective of FIG. 16, but the supporting physical video cameras are so relatively distant, that the physical video cameras are unable to supply sufficient resolution to render the ground region 1650 enclosed by the virtual camera frustum 1640 in sufficient resolution.

In one of the methods described here, a form of automatic navigational assistance is provided to achieve acceptable virtual camera view quality while maintaining the ground target intentions of virtual camera operator(s). Specific acceptable virtual camera view quality criteria matter in the described methods, to the extent that the view quality criteria can be related to properties of the physical video camera inputs and the collective geometric arrangement of the physical video cameras around a target arena.

Figure 17C:
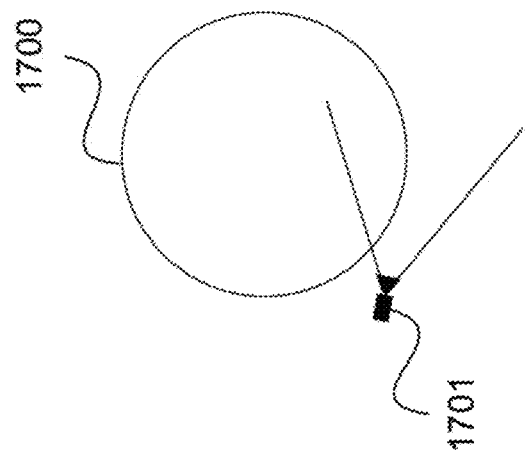
FIG. 17A-17C are schematic diagrams, presenting a volume of interest as a simplified 2D region of interest, to illustrate the geometric relationships between a volume of interest and virtual camera perspectives.
Figure 17B:
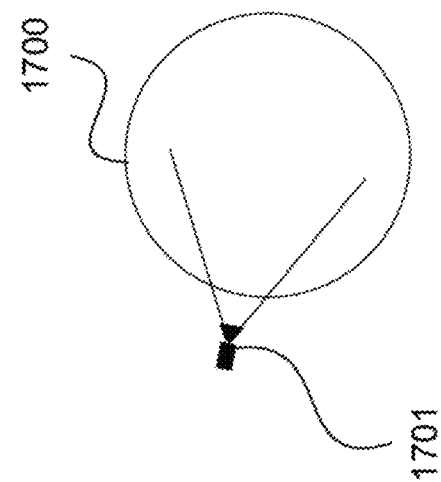
Figure 17A:
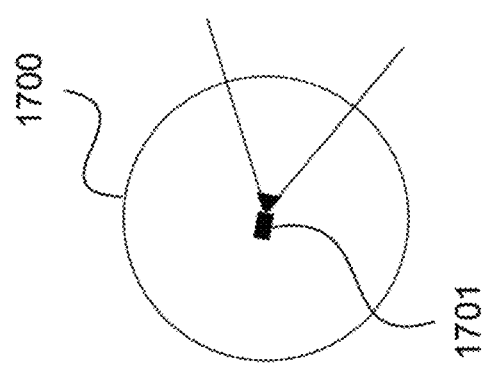

When targeted volumes of interest, such as volume of interest 240 in FIG. 2, emerge from the geometry of surrounding physical video cameras, for ease of description, the targeted volumes of interest may be considered as simple geometric shapes on or near the ground. The actual shape of a target volume of interest does not need to be circular. However, the target volume of interest does need to be convex for the auto-navigational assistance methods described here to be applied. The virtual camera needs to be able to be described in terms of whether the virtual camera is looking into, through or out of the volume of interest, or not looking into, through or out of a volume of interest. FIGS. 17A, 17B and 17C each show a top-down perspective of a volumetric region of interest represented as a simple circle.

FIG. 17A shows a volumetric region of interest 1700 with a virtual camera 1701 arranged inside the region of interest 1700 looking outward. The arrangement of FIG. 17A will generally provide acceptable view quality.

FIG. 17B shows the same volumetric region of interest 1700 with a virtual camera 1701 arranged to look into/through the volumetric region of interest 1701. The arrangement of FIG. 17B will also generally provide acceptable view quality.

FIG. 17C shows a volumetric region of interest 1700 with a virtual camera 1701 arranged so as to look at a slight tangent to the region of interest 1700. Any players outside the targeted volumetric region of interest 1700 from the tangential perspective of FIG. 17C will have poor view quality.

To provide useful navigational assistance in situations such as the arrangement shown in FIG. 17C, the intended target region of the virtual camera (e.g., 1701) needs to be determined. The target region for a virtual camera may be determined using any suitable method. For example, the target region for a virtual camera may be determined based on target tracking mechanisms (e.g., video tracking, or electronic tags attached to players) or the target region for a virtual camera may be known as a matter of human operator input. A person with a view of the wider activity on a field (e.g., someone that is traditionally a camera operator) may be tasked with continuously expressing a target region on the field through a controller input.

Figure 6:
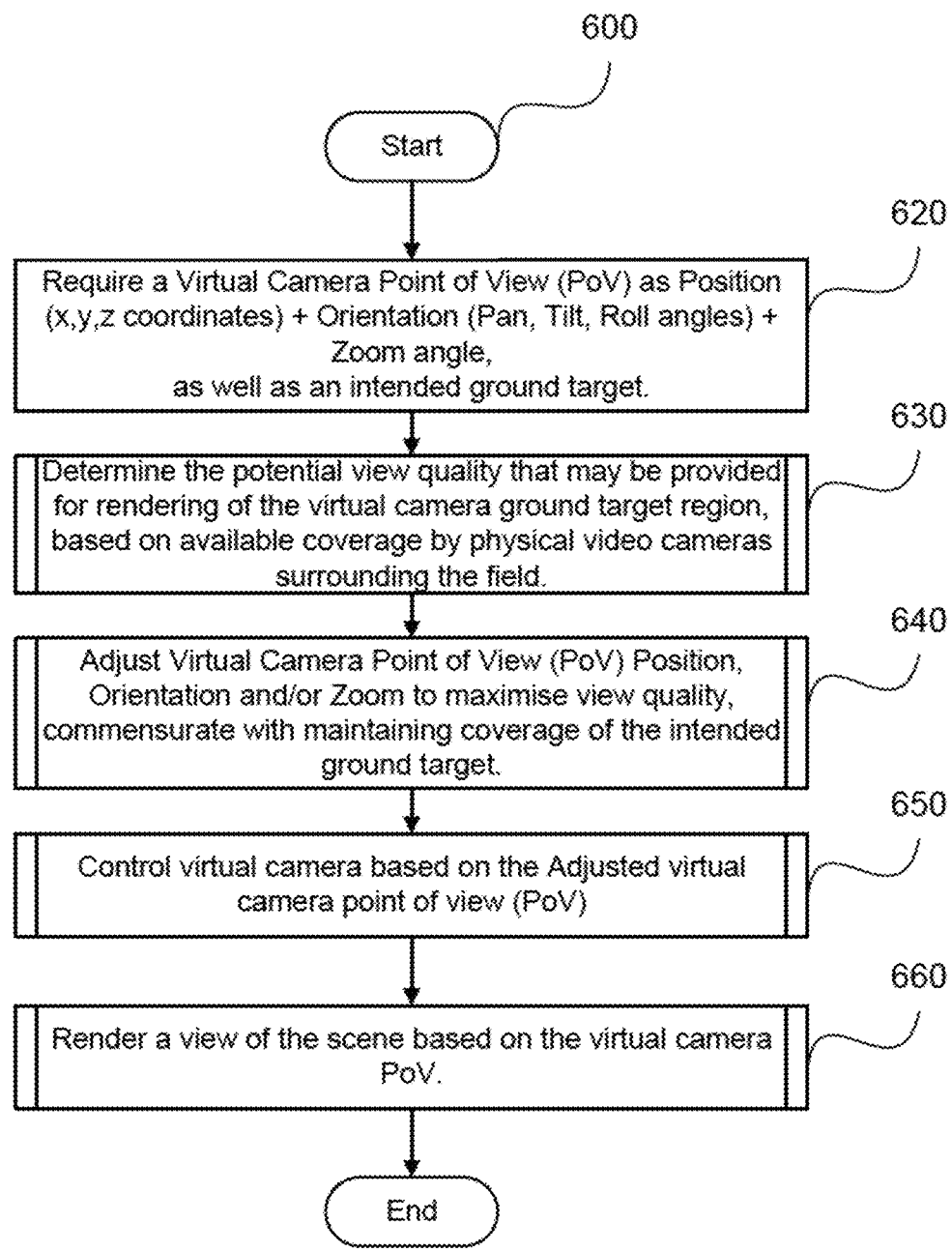
FIG. 6 is a flow diagram showing a method of rendering a view of a scene.
Figure 7:
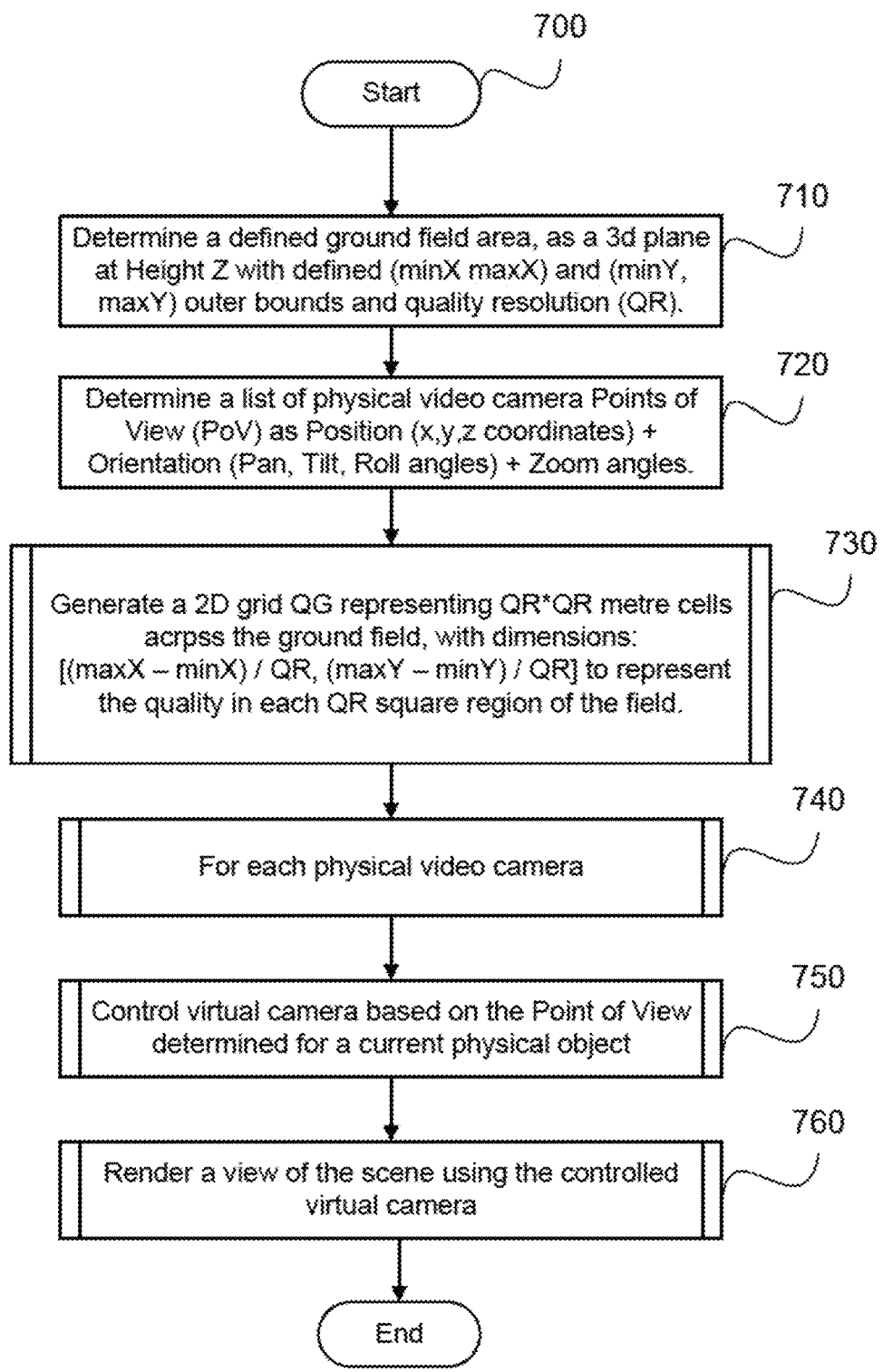
FIG. 7 is a flow diagram showing a method of controlling the perspective of a virtual camera.

A method 600 of rendering a view of a scene will be described below with reference to FIG. 6. The method 600 will be described by way of example with reference to the arena 110 and the cameras 120A-120X. The method 600 may be used to maintain view quality for a scene commensurate with also maintaining a view of a target.

The method 600 may be implemented as one or more software code modules of the software application program 833 resident in the hard disk drive 810 and being controlled in its execution by the processor 805.

The method 600 begins at determining step 620, where a virtual camera point of view (PoV) is determined under execution of the processor 805. The point of view determined at step 620 comprises a position (i.e., x, y, z coordinates) of a virtual camera being used to render the view of the scene. The point of view determined at step 620 also comprises orientation (i.e., pan, tilt, roll angles) of the virtual camera and zoom angle of the virtual camera. An intended ground target region for the virtual camera is also determined at step 620.

At the next determining step 630, a potential view quality that may be provided for rendering of the virtual camera ground target region is determined, under execution of the processor 805. The potential view quality is determined based on available coverage by the physical video cameras 120A-120X surrounding the playing field within the arena 110. The potential view quality may be determined at step 630 in accordance with the examples of FIGS. 9 to 16. For example, the illustrated view of virtual camera 1020 in FIG. 10 would be of high quality. In contrast, the illustrated view of virtual camera 1320 in the example of FIG. 13 would be of very poor quality.

The method 600 continues at adjusting step 640, where the virtual camera point of view (PoV) position, orientation and/or zoom for the virtual camera is adjusted to maximise view quality, commensurate with maintaining coverage of the intended ground target. The virtual camera point of view (PoV) position, orientation and/or zoom for the virtual camera may be adjusted using any method described below with reference to FIGS. 18A to 22C.

At the next controlling step 650, the virtual camera is controlled based on the adjusted virtual camera point of view determined at step 640. The virtual camera may be controlled at step 650 in response to a user command being received by the processor 805, where the user command changes at least one viewpoint attribute of the virtual camera. For example, the user command may change a position (i.e., x,y,z coordinates), orientation (i.e., pan, tilt, roll angles) or zoom angle of the virtual camera.

Then at rendering step 660, a view of the scene is rendered by the virtual camera based on the virtual camera point of view. Another method 700 of rendering a view of a scene will be described below with reference to FIG. 7. The method 700 will be described by way of example with reference to the arena 110 and the cameras 120A-120X. The method 700 may be used to maintain view quality for a scene commensurate with also maintaining a view of a target.

The method 700 may be implemented as one or more software code modules of the software application program 833 resident in the hard disk drive 810 and being controlled in its execution by the processor 805.

The method 700 begins at determining step 710, where a defined ground field area is determined under execution of the processor 805. The ground field area is determined at step 710 as a three-dimensional (3D) plane at a height Z with defined (minX, maxX) and (minY, maxY) outer bounds and quality resolution (QR).

At the next determining step 720, a list of physical camera points of view (PoV) is determined under execution of the processor 805. The points of view may be determined at step 720 for each of the cameras 120A-120X. The points of view determined at step 720 each comprise a position (i.e., x,y,z coordinates) of a physical camera (e.g., 120A). The point of view determined at step 720 also comprises orientation (i.e., pan, tilt, roll angles) of the physical camera and zoom angle of the physical camera.

The method 700 continues at a next step 730, where a two-dimensional (2D) grid ("QG"), as illustrated in FIG. 5, to represent cells across the ground field area determined at step 710, is determined under execution of the processor 805. Each of the cells is square with dimensions QR×QR meters. The grid has dimensions [(maxX−minX)/QR, (maxY−minY)/QR] to represent the quality in each QR square cell region of the field.

Then, for each of the physical cameras 120A-120X, the method 700 proceeds from step 740 to steps 750 and 760.

At controlling step 750, the virtual camera is controlled based on the point of view determined at step 720 for a current physical camera (e.g., 120A). The virtual camera may be controlled at step 650 in response to a user command being received by the processor 805, where the user command changes at least one viewpoint attribute of the virtual camera. For example, the user command may change a position (i.e., x, y, z coordinates), orientation (i.e., pan, tilt, roll angles) or zoom angle of the virtual camera. Then at rendering step 760, a view of the scene is rendered using the controlled virtual camera.

Figure 18C:
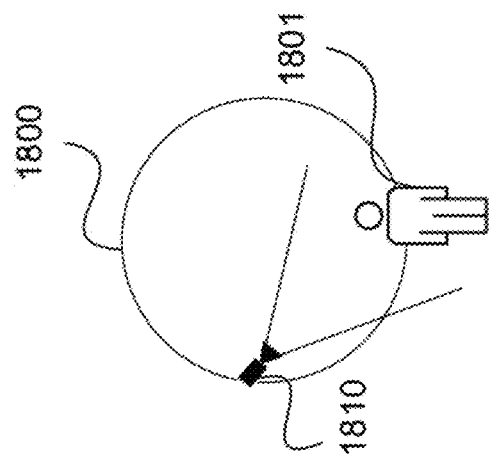
FIG. 18C is a schematic diagram showing the virtual camera after being moved in an arc to the right and then being rotated.

One method of adjusting a virtual camera point of view, as at step 640, to maintain view quality, will now be described by way of example with reference to FIGS. 18A, 18B and 18C. Initially at some point in a time sequence, target player 1801 as seen in FIG. 18A is inside a high quality volume of interest region 1800. A view of the target 1801 inside the region 1800 is being captured by a virtual camera 1810

Figure 18B:
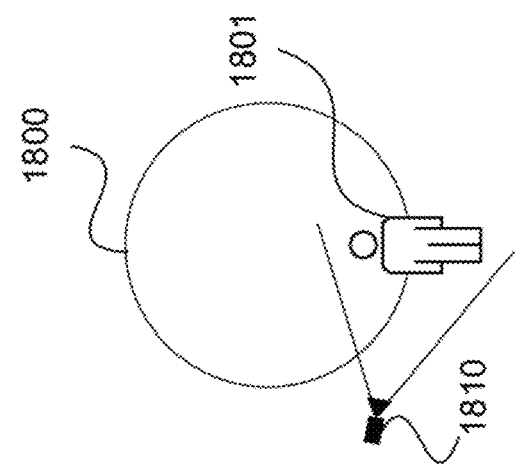
FIG. 18B is a schematic diagram showing the target of FIG. 18A moved downward away from the volume of interest.
Figure 18A:
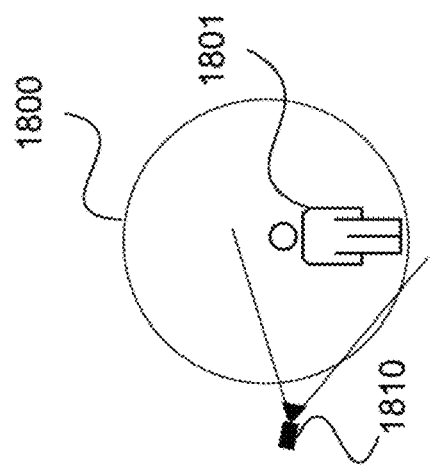
FIG. 18A is a schematic diagram showing a virtual camera capturing a view of a target player inside a volume of interest region.

Subsequently, as shown in FIG. 18B, the target 1801 has moved downward away from the volume of interest 1800. If the position of the camera 1810 was translated downward to follow target player 1801, as shown in FIG. 18B, the camera 1810 is moved into a perspective that would provide poor quality as the camera 1810 is directed tangential to the volume of interest 1800.

Figure 19C:
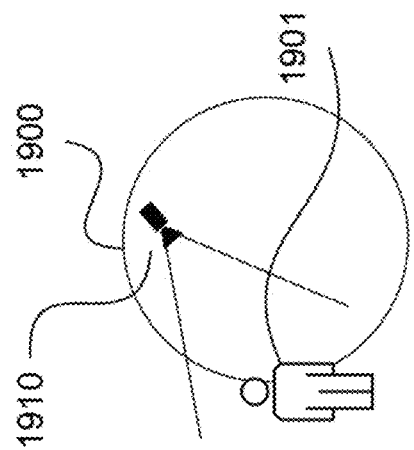
FIG. 19C is a schematic diagram showing the virtual camera after being rotated in an arc to the right.

Continuing the example, an automatic compensation may be performed by moving the virtual camera 1810 in an arc to the right as shown in FIG. 18C and then rotating the camera 1810 to still show the target 1801 as intended. However, as shown in FIG. 18C, the camera 1810 is now showing the target 1801 by looking through the volume of interest region 1800 to ensure view quality. The method described with reference to FIGS. 18A, 18B and 18C may be referred to as "rotating perspective to accommodate translation". Another method of adjusting a virtual camera point of view, as at step 640, auto-navigation assistance to maintain view quality, will now be described with reference to FIGS. 19A, 19B and 19C. Initially at some point in a time sequence, a target 1901 as seen in FIG. 19A is inside a high quality volume of interest region 1900. A view of the target 1901 inside the region 1900 is being captured by a virtual camera 1910.

Figure 19B:
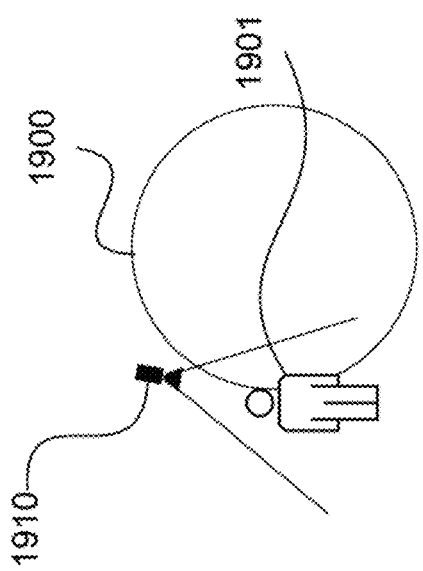
FIG. 19B is a schematic diagram showing the target of FIG. 19A moved left away from the volume of interest.
Figure 19A:
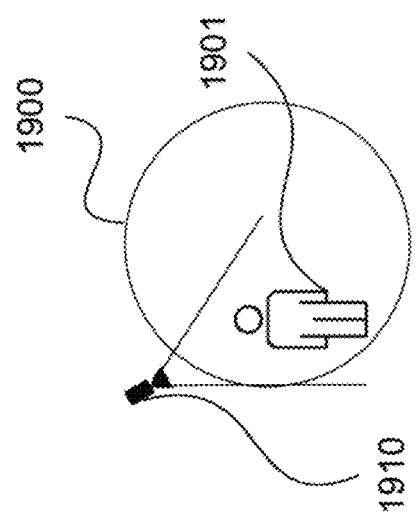
FIG. 19A is a schematic diagram showing a virtual camera capturing a view of a target player inside a volume of interest region.

Subsequently, as shown in FIG. 19B, the target 1901 has moved left away from the volume of interest 1900. If the orientation of the camera 1910 was rotated clockwise to follow target player 1901, as shown in FIG. 19B, the camera 1910 is rotated into a perspective that would provide poor quality as the camera 1910 is directed tangential to the volume of interest 1900.

Continuing the example, an automatic compensation may be performed by rotating the virtual camera 1910 in an arc to the right as shown in FIG. 19C, to still show the target 1901 as intended. However, as shown in FIG. 19C, the camera 1910 is now showing the target 1901 by looking through the volume of interest region 1900 to ensure view quality. The method described with reference to FIGS. 19A, 19B and 19C may be referred to as "translating perspective to accommodate rotation".

Figure 20C:
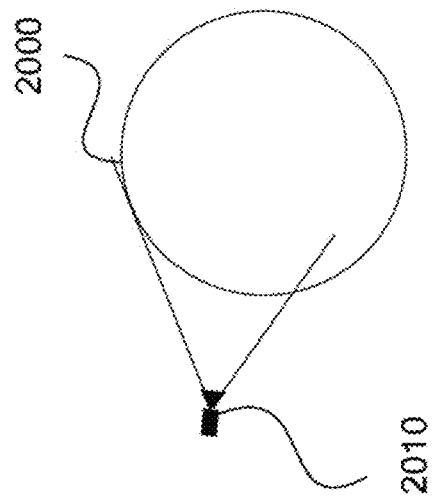
FIG. 20C shows the virtual camera of FIG. 20B after being translated or rotated to maintain the volume of interest centred in the view of the virtual camera.
Figure 20B:
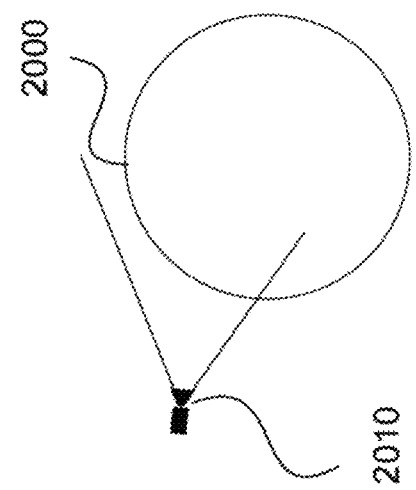
FIG. 20B shows the virtual camera moved back away from the volume of interest of FIG. 20A.
Figure 20A:
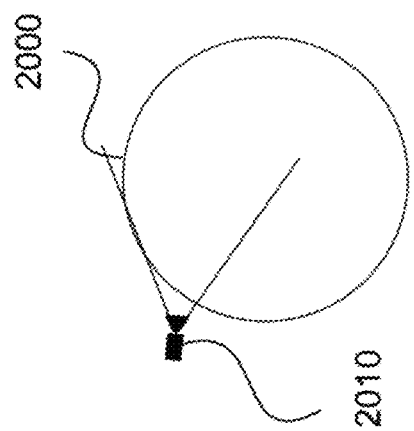
FIG. 20A shows a virtual camera looking at the top half of a target volume of interest.

Another method of adjusting a virtual camera point of view, as at step 640, to maintain view quality, will now be described by way of example with reference to FIGS. 20A, 20B and 20C. In the example of FIGS. 20A, 20B and 20C, the target is more diffuse, including an entire volume of interest 2000. Initially at some point in a time sequence, a virtual camera 2010 is looking at the top half of the target volume of interest 2000.

Subsequently, as shown in FIG. 20B, the virtual camera 2010 is moved back away from the volume of interest 2000, exposing a portion of a view to a perspective external and tangential to the volume of interest 2000. An automatic compensation may be performed by either translating or rotating the virtual camera 2010 to maintain the volume of interest centred in the view of the virtual camera 2010, as shown in FIG. 20C. The method described with reference to FIGS. 20A, 20B and 20C may be referred to as "centering to accommodate camera backing up".

Figure 21C:
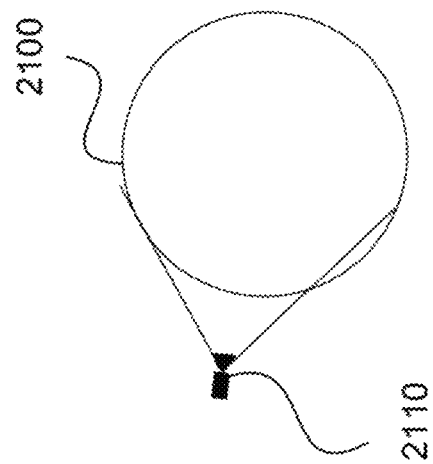
FIG. 21C shows the virtual camera of FIG. 21B after being translated or rotated to maintain the volume of interest centred in the view of the virtual camera.
Figure 21B:
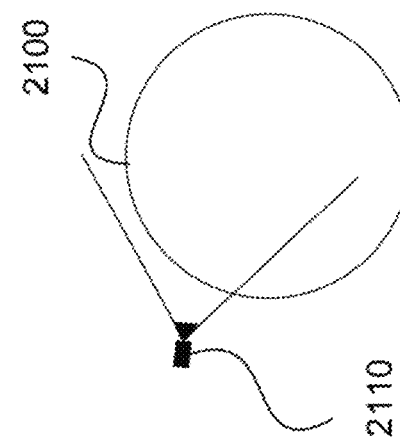
FIG. 21B shows the virtual camera of FIG. 21A zoomed out on the volume of interest of FIG. 21A.
Figure 21A:
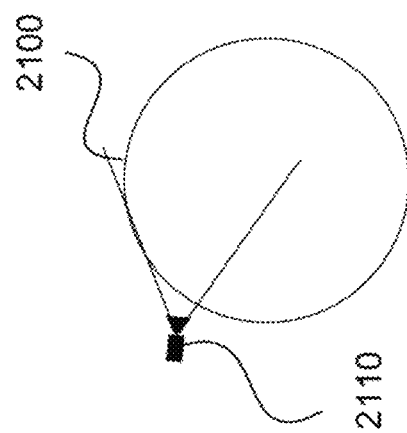
FIG. 21A shows a virtual camera looking at the top half of a target volume of interest.

Another method of adjusting a virtual camera point of view, as at step 640, to maintain view quality, will now be described by way of example with reference to FIGS. 21A, 21B and 21C. In the example of FIGS. 21A, 21B and 21C, the target is diffuse and includes an entire volume of interest 2100. Initially, at some point in a time sequence, a virtual camera 2110 as seen in FIG. 21A is looking at the top half of a target volume of interest 2100.

Subsequently, as shown in FIG. 21B, the virtual camera 2110 is zoomed out on the volume of interest 2100, exposing a portion of a view to a perspective external and tangential to the volume of interest 2100.

An automatic compensation may be performed by either translating or rotating the virtual camera to keep the volume of interest 2100 centred in the view of the virtual camera 2110, as seen in FIG. 21 C. The method described with reference to FIGS. 21A, 21B and 21C may be referred to as "centering to accommodate camera zooming out".

Figure 22C:
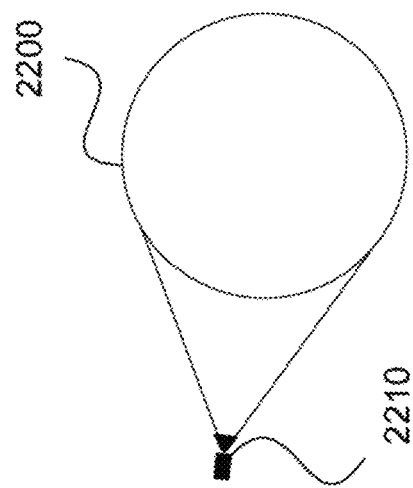
FIG. 22C shows the virtual camera of FIG. 22B after being moved back in towards the volume of interest.
Figure 22B:
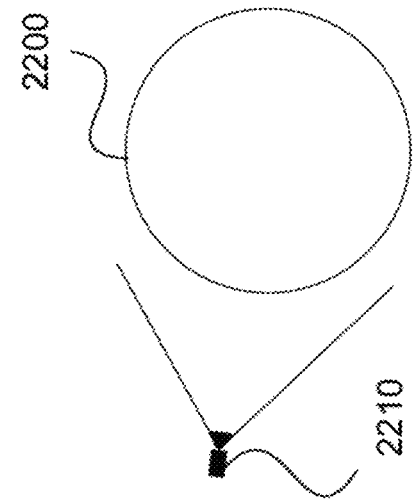
FIG. 22B shows the virtual camera of FIG. 22A moved away from the volume of interest of FIG. 22A.
Figure 22A:
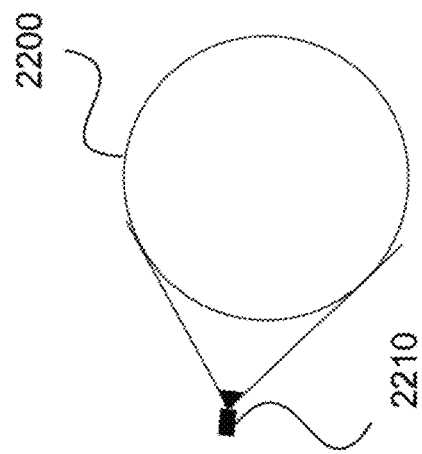
FIG. 22A shows a virtual camera configured to incorporate a view of a target volume of interest.

Another method of adjusting a virtual camera point of view, as at step 640, to maintain view quality, will now be described by way of example with reference to FIGS. 22A, 22B and 22C. In the example of FIGS. 22A, 22B and 22C, similarly to the examples of FIGS. 20A-20C and 21A-21C, the target is more diffuse and includes an entire volume of interest 2200. Initially, at some point in a time sequence, a virtual camera 2210 as seen in FIG. 22A is configured to incorporate a view of the entire volume of interest 2200. In the examples of FIGS. 20A-20C and 21A-21C described above, the virtual cameras (i.e., 2010, 2110) may be guided into a particular position by progressively centering the view through backing up and zooming-out the virtual camera.

However, in the example of FIGS. 22A, 22B and 22C, since the entire volume of interest 2200 is already in view of the camera 2210, further centering methods may not be used.

As seen in FIG. 22B, the virtual camera 2210 is moved further away from the volume of interest 2200, and there is no room to do further centering. However, the movement of the virtual camera 2210, as seen in FIG. 22B, has exposed regions outside of and tangential to the volume of interest 2200 which will result in poor view quality. An automatic compensation may be performed by zooming in on the volume of interest 2200 as the camera 2210 is moved back under operator control, to limit the width of the viewed region to the volume of interest 2200. In addition to such automatic compensation, the extent of auto-zoom-in that has been used to maintain the compensation may be tracked. Then, if the camera 2210 is subsequently moved back in towards the volume of interest 2200, the tighter zoom may be progressively reintroduced up to the point where there is no longer any zoom compensation. The method described with reference to FIGS. 22A, 22B and 22C may be referred to "elastic zoom-in to accommodate distant perspectives".

Combining the methods described above with reference to FIGS. 18 to 22C, an operator may freely navigate around the scene with a virtual camera that always attempts to maintain target objects or regions in view without fighting directly against operator control actions.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

The invention claimed is:

1. An apparatus comprising:
one or more hardware processors; and
one or more memories which store instructions executable by the one or more hardware processors to cause the apparatus to perform at least:
obtaining information for specifying a position and orientation of each of a plurality of image capturing apparatuses that capture images of a region from different directions respectively;
specifying a position of a virtual viewpoint corresponding to a virtual viewpoint image that is generated based on a plurality of captured images obtained by the plurality of image capturing apparatuses; and
causing, based on the obtained information and the specified position of the virtual viewpoint, a display screen to display a visualization image indicating image quality of virtual viewpoint images to be generated in respective cases where the virtual viewpoint at the specified position is directed to each of a plurality of partial areas in the region,
wherein the visualization image distinguishably indicates a first partial area and a second partial area in the region, wherein image quality of a first virtual viewpoint image to be generated in a case where the virtual viewpoint at the specified position is directed to the first partial area is different from image quality of a second virtual viewpoint image to be generated in a case where the virtual viewpoint at the specified position is directed to the second partial area.

2. The apparatus according to claim 1, wherein the image quality to be indicated by the visualization image changes according to the specified position of the virtual viewpoint.

3. The apparatus according to claim 1, wherein the image quality to be indicated by the visualization image changes according to an angle of view of the virtual viewpoint.

4. The apparatus according to claim 1, wherein the plurality of partial areas are displayed with respective colors in the visualization image, wherein each of the colors indicates image quality.

5. The apparatus according to claim 1, wherein the image quality indicated by the visualization image represents at least one of resolution of a virtual viewpoint image and degree of perspective error in a virtual viewpoint image.

6. The apparatus according to claim 1, wherein the visualization image further indicates the specified position of the virtual viewpoint.

7. The apparatus according to claim 6, wherein the visualization image further indicates an orientation of the virtual viewpoint.

8. The apparatus according to claim 6, wherein the visualization image further indicates a field of view of the virtual viewpoint.

9. The apparatus according to claim 1, wherein the position of the virtual viewpoint is specified based on input from a user interface.

10. The apparatus according to claim 1, wherein the visualization image concurrently indicates the image quality of the virtual viewpoint images to be generated in the respective cases where the virtual viewpoint at the specified position is directed to each of the plurality of partial areas in the region, and wherein the plurality of partial areas include both an area in a current field of view of the virtual viewpoint and a plurality of areas outside the current field of view of the virtual viewpoint.

11. The apparatus according to claim 1, wherein image quality corresponding to a partial area indicated by the visualization image is determined based on a relationship between an angle from the specified position of the virtual viewpoint to the partial area and an angle from a position of an image capturing apparatus to the partial area.

12. The apparatus according to claim 1, wherein image quality corresponding to a partial area indicated by the visualization image is determined based on a relationship between a distance from the specified position of the virtual viewpoint to the partial area and a distance from a position of an image capturing apparatus to the partial area.

13. The apparatus according to claim 1, wherein the visualization image represents the region viewed from a position independent from the specified position of the virtual viewpoint.

14. A method comprising:
obtaining information for specifying a position and orientation of each of a plurality of image capturing apparatuses that capture images of a region from different directions respectively;
specifying a position of a virtual viewpoint corresponding to a virtual viewpoint image that is generated based on a plurality of captured images obtained by the plurality of image capturing apparatuses; and
causing, based on the obtained information and the specified position of the virtual viewpoint, a display screen to display a visualization image indicating image quality of virtual viewpoint images to be generated in respective cases where the virtual viewpoint at the specified position is directed to each of a plurality of partial areas in the region, wherein the visualization image distinguishably indicates a first partial area and a second partial area in the region, wherein image quality of a first virtual viewpoint image to be generated in a case where the virtual viewpoint at the specified position is directed to the first partial area is different from image quality of a second virtual viewpoint image to be generated in a case where the virtual viewpoint at the specified position is directed to the second partial area.

15. The method according to claim 14, wherein the image quality to be indicated by the visualization image changes according to the specified position of the virtual viewpoint.

16. The method according to claim 14, wherein the image quality indicated by the visualization image represents at least one of resolution of a virtual viewpoint image and degree of perspective error in a virtual viewpoint image.

17. A non-transitory computer readable medium having a program for causing a computer to perform a method, the method comprising:

obtaining information for specifying a position and orientation of each of a plurality of image capturing apparatuses that capture images of a region from different directions respectively;

specifying a position of a virtual viewpoint corresponding to a virtual viewpoint image that is generated based on a plurality of captured images obtained by the plurality of image capturing apparatuses; and causing, based on the obtained information and the specified position of the virtual viewpoint, a display screen to display a visualization image indicating image quality of virtual viewpoint images to be generated in respective cases where the virtual viewpoint at the specified position is directed to each of a plurality of partial areas in the region, wherein the visualization image distinguishably indicates a first partial area and a second partial area in the region, wherein image quality of a first virtual viewpoint image to be generated in a case where the virtual viewpoint at the specified position is directed to the first partial area is different from image quality of a second virtual viewpoint image to be generated in a case where the virtual viewpoint at the specified position is directed to the second partial area.

* * * * *